(12) United States Patent
Hatton et al.

(10) Patent No.: US 8,986,130 B2
(45) Date of Patent: Mar. 24, 2015

(54) GOLF CLUBS AND GOLF CLUB HEADS

(71) Applicant: Nike, Inc., Beaverton, OR (US)

(72) Inventors: Philip J. Hatton, Portland, OR (US);
Brian Kammerer, Fort Worth, TX (US);
Jeffrey A. Hadden, Worthington, OH (US); Gregory S. Kramer, Hilliard, OH (US); Douglas A. Thornton, Columbus, OH (US); Joshua M. Boggs, New Albany, OH (US); Sherry L. Jones, Pataskala, OH (US); James H. Lua, Columbus, OH (US); Daniel F. Wisniewski, Columbus, OH (US)

(73) Assignee: Nike, Inc., Beaverton, OR (US)

( * ) Notice: Subject to any disclaimer, the term of this patent is extended or adjusted under 35 U.S.C. 154(b) by 143 days.

(21) Appl. No.: 13/828,793

(22) Filed: Mar. 14, 2013

(65) Prior Publication Data

US 2013/0203518 A1 Aug. 8, 2013

Related U.S. Application Data

(63) Continuation-in-part of application No. 13/250,051, filed on Sep. 30, 2011, now Pat. No. 8,668,595.

(60) Provisional application No. 61/665,834, filed on Jun. 28, 2012, provisional application No. 61/480,322, filed on Apr. 28, 2011, provisional application No. 61/653,771, filed on May 31, 2012.

(51) Int. Cl.
*A63B 53/06* (2006.01)
*A63B 69/36* (2006.01)
(Continued)

(52) U.S. Cl.
CPC ............. *A63B 69/3658* (2013.01); *A63B 53/10* (2013.01); *A63B 53/14* (2013.01);
(Continued)

(58) Field of Classification Search
USPC .................................................. 473/222–226
See application file for complete search history.

(56) References Cited

U.S. PATENT DOCUMENTS

| 569,438 A | 10/1896 | Urquhart |
| 648,256 A | 4/1900 | Hartley |

(Continued)

FOREIGN PATENT DOCUMENTS

| DE | 202007013632 U1 | 12/2007 |
| EP | 2332619 A1 | 6/2011 |

(Continued)

OTHER PUBLICATIONS

International Search Report in related International Application No. PCT/US12/35476; dated Aug. 24, 2012.

(Continued)

*Primary Examiner* — Ronald Laneau
(74) *Attorney, Agent, or Firm* — Banner & Witcoff, Ltd.

(57) ABSTRACT

Golf clubs according to at least some example aspects of this disclosure may include a golf club head and a shaft configured to engage with the golf club head which includes a grip engaged with the shaft. Further, the golf club may include a monitoring device, which includes a sensor and a transmitter. Additionally, the monitoring device may be configured to determine data related to the characteristics of a golf swing. Further, the monitoring device may be configured to transmit the data related to the characteristics of a golf swing to a remote computer.

41 Claims, 26 Drawing Sheets

(51) Int. Cl.

| | | |
|---|---|---|
| *A63B 53/14* | (2006.01) | |
| *A63B 71/06* | (2006.01) | |
| *A63B 24/00* | (2006.01) | |
| *A63B 53/00* | (2006.01) | |
| *G06F 3/0346* | (2013.01) | |
| *A63B 59/00* | (2006.01) | |
| *A63B 53/10* | (2006.01) | |
| *A63B 53/04* | (2006.01) | |
| *A63B 59/02* | (2006.01) | |
| *A63B 59/06* | (2006.01) | |
| *A63B 59/14* | (2006.01) | |
| *A63B 49/02* | (2006.01) | |
| *A63B 49/08* | (2006.01) | |

(52) U.S. Cl.
CPC ........ *A63B 69/3632* (2013.01); *A63B 69/3685* (2013.01); *A63B 71/0619* (2013.01); *A63B 71/0622* (2013.01); *A63B 24/0003* (2013.01); *A63B 24/0021* (2013.01); *A63B 53/00* (2013.01); *A63B 53/04* (2013.01); *A63B 2053/005* (2013.01); *A63B 2071/0647* (2013.01); *A63B 2220/16* (2013.01); *A63B 2220/30* (2013.01); *A63B 2220/40* (2013.01); *A63B 2220/53* (2013.01); *A63B 2220/803* (2013.01); *A63B 2220/833* (2013.01); *A63B 2225/15* (2013.01); *A63B 2225/20* (2013.01); *A63B 2225/50* (2013.01); *A63B 53/0466* (2013.01); *A63B 2053/0433* (2013.01); *G06F 3/0346* (2013.01); *A63B 53/047* (2013.01); *A63B 59/0088* (2013.01); *A63B 59/02* (2013.01); *A63B 59/06* (2013.01); *A63B 59/14* (2013.01); *A63B 49/0288* (2013.01); *A63B 49/08* (2013.01); *A63B 53/007* (2013.01); *A63B 59/0033* (2013.01); *A63B 2209/00* (2013.01)
USPC ....................................................... 473/223

(56) References Cited

U.S. PATENT DOCUMENTS

| | | |
|---|---|---|
| 651,920 A | 6/1900 | Cushing, Jr. |
| 670,522 A | 3/1901 | Thompson |
| 727,086 A | 5/1903 | Burnam |
| 1,058,463 A | 4/1913 | Pringle |
| 1,083,434 A | 1/1914 | Curry |
| 1,135,621 A | 4/1915 | Roberts |
| 1,137,457 A | 4/1915 | Breitenbaugh |
| 1,165,559 A | 12/1915 | Vories |
| 1,190,589 A | 7/1916 | Rolfe |
| 1,206,104 A | 11/1916 | Goodrich |
| 1,206,105 A | 11/1916 | Goodrich |
| 1,219,417 A | 3/1917 | Vories |
| 1,235,922 A | 8/1917 | Pittar |
| 1,250,301 A | 12/1917 | Goodrich |
| 1,258,212 A | 3/1918 | Goodrich |
| 1,429,569 A | 9/1922 | Craig |
| 1,529,959 A | 3/1925 | Martin |
| 1,549,265 A | 8/1925 | Kaden |
| 1,556,928 A | 10/1925 | Ganders |
| 1,568,485 A | 1/1926 | Turney |
| 1,594,850 A | 8/1926 | Perkins |
| 1,605,140 A | 11/1926 | Perkins |
| 1,620,588 A | 3/1927 | Wilson |
| 1,644,177 A | 10/1927 | Collins |
| 1,676,518 A | 7/1928 | Boles |
| 1,697,846 A | 1/1929 | Anderson |
| 1,697,998 A | 1/1929 | Novak et al. |
| 1,818,359 A | 8/1931 | Samaras et al. |
| 1,916,792 A | 7/1933 | Hadden |
| 1,974,224 A | 9/1934 | Van Der Linden |
| 1,993,928 A | 3/1935 | Glover |
| 2,041,676 A | 5/1936 | Gallagher |
| 2,179,034 A | 11/1939 | Duncan, Jr. |
| 2,217,338 A | 10/1940 | Fuller |
| 2,242,670 A | 5/1941 | Fuller |
| 2,305,270 A | 12/1942 | Nilson |
| 2,329,313 A | 9/1943 | Winter |
| 2,381,636 A | 8/1945 | Bancroft |
| 2,384,333 A | 9/1945 | Nilson |
| 2,451,262 A | 10/1948 | Watkins |
| 2,455,150 A | 11/1948 | Verderber |
| 2,475,926 A | 7/1949 | Verderber |
| 2,477,438 A | 7/1949 | Brouwer |
| 2,495,444 A | 1/1950 | Chamberlain et al. |
| 2,520,701 A | 8/1950 | Verderber |
| 2,520,702 A | 8/1950 | Verderber |
| 2,571,970 A | 10/1951 | Verderber |
| 2,576,866 A | 11/1951 | Verderber |
| 2,593,368 A | 4/1952 | Verderber |
| 2,691,525 A | 10/1954 | Callaghan, Sr. |
| 2,705,147 A | 3/1955 | Winter |
| 2,777,694 A | 1/1957 | Winter |
| 2,847,219 A | 8/1958 | Shoemaker et al. |
| 2,962,286 A | 11/1960 | Brouwer |
| 3,170,698 A | 2/1965 | Schoeffler et al. |
| 3,270,564 A | 9/1966 | Evans |
| 3,305,235 A | 2/1967 | Williams, Jr. |
| 3,477,720 A | 11/1969 | Saba |
| 3,601,399 A | 8/1971 | Agens et al. |
| 3,788,647 A | 1/1974 | Evans |
| 3,791,647 A | 2/1974 | Verderber |
| 3,792,863 A | 2/1974 | Evans |
| 3,806,131 A | 4/1974 | Evans |
| 3,840,231 A | 10/1974 | Moore |
| 3,945,646 A | 3/1976 | Hammond |
| 3,966,210 A | 6/1976 | Rozmus |
| 3,976,299 A | 8/1976 | Lawrence et al. |
| 4,165,874 A | 8/1979 | Lezatte et al. |
| 4,291,883 A | 9/1981 | Smart et al. |
| 4,856,782 A | 8/1989 | Cannan |
| 4,871,174 A | 10/1989 | Kobayashi |
| 4,878,666 A | 11/1989 | Hosoda |
| 4,895,371 A | 1/1990 | Bushner |
| 4,898,387 A | 2/1990 | Finney |
| 4,991,850 A | 2/1991 | Wilhlem |
| 5,133,553 A | 7/1992 | Divnick |
| 5,211,401 A | 5/1993 | Hainey |
| 5,221,088 A | 6/1993 | McTeigue et al. |
| 5,228,689 A | 7/1993 | Donofrio, Sr. |
| 5,253,869 A | 10/1993 | Dingle et al. |
| 5,332,225 A | 7/1994 | Ura |
| 5,340,104 A | 8/1994 | Griffin |
| 5,372,365 A | 12/1994 | McTeigue et al. |
| D354,103 S | 1/1995 | Allen |
| 5,385,346 A | 1/1995 | Carroll et al. |
| 5,393,056 A | 2/1995 | Richardson |
| 5,407,196 A | 4/1995 | Busnardo |
| 5,413,337 A | 5/1995 | Goodman et al. |
| 5,429,366 A | 7/1995 | McCabe |
| D363,749 S | 10/1995 | Kenmi |
| 5,464,217 A | 11/1995 | Shenoha et al. |
| 5,467,988 A | 11/1995 | Henwood |
| 5,478,082 A | 12/1995 | DeKnight et al. |
| 5,489,097 A | 2/1996 | Simmons |
| 5,497,995 A | 3/1996 | Swisshelm |
| 5,516,106 A | 5/1996 | Henwood |
| D372,063 S | 7/1996 | Hueber |
| 5,533,725 A | 7/1996 | Reynolds, Jr. |
| 5,538,245 A | 7/1996 | Moore |
| D375,987 S | 11/1996 | Lin |
| 5,580,058 A | 12/1996 | Coughlin |
| 5,581,993 A | 12/1996 | Strobel |
| 5,607,365 A | 3/1997 | Wolf |
| 5,616,832 A | 4/1997 | Nauck |
| 5,626,528 A | 5/1997 | Toulon |
| 5,681,993 A | 10/1997 | Heitman |
| 5,692,968 A | 12/1997 | Shine |
| 5,709,613 A | 1/1998 | Sheraw |
| D392,007 S | 3/1998 | Fox |
| 5,724,265 A | 3/1998 | Hutchings |

(56) References Cited

U.S. PATENT DOCUMENTS

| | | |
|---|---|---|
| 5,728,006 A | 3/1998 | Teitell et al. |
| 5,779,555 A | 7/1998 | Nomura et al. |
| D397,387 S | 8/1998 | Allen |
| 5,792,000 A | 8/1998 | Weber et al. |
| D398,946 S | 9/1998 | Kenmi |
| 5,820,481 A | 10/1998 | Raudman |
| 5,826,874 A | 10/1998 | Teitell et al. |
| 5,888,148 A | 3/1999 | Allen |
| 5,928,087 A | 7/1999 | Emberton et al. |
| D414,234 S | 9/1999 | Darrah |
| 5,947,841 A | 9/1999 | Silvestro |
| 5,951,410 A | 9/1999 | Butler et al. |
| 5,955,667 A | 9/1999 | Fyfe |
| 6,012,988 A | 1/2000 | Burke |
| 6,015,354 A | 1/2000 | Ahn et al. |
| 6,018,705 A | 1/2000 | Gaudet et al. |
| 6,044,704 A | 4/2000 | Sacher |
| 6,045,364 A | 4/2000 | Dugan |
| 6,052,654 A | 4/2000 | Gaudet et al. |
| 6,120,384 A | 9/2000 | Drake |
| 6,149,533 A | 11/2000 | Finn |
| 6,196,932 B1 | 3/2001 | Marsh et al. |
| 6,206,788 B1 | 3/2001 | Krenzler |
| 6,224,493 B1 | 5/2001 | Lee et al. |
| 6,261,102 B1 | 7/2001 | Dugan et al. |
| 6,270,422 B1 | 8/2001 | Fisher |
| 6,299,553 B1 | 10/2001 | Petuchowski et al. |
| 6,348,009 B1 | 2/2002 | Dischler |
| RE37,647 E | 4/2002 | Wolf |
| 6,394,910 B1 | 5/2002 | McCarthy |
| 6,402,634 B2 | 6/2002 | Lee et al. |
| 6,402,638 B1 | 6/2002 | Kelley |
| 6,413,167 B1 | 7/2002 | Burke |
| 6,430,843 B1 | 8/2002 | Potter et al. |
| 6,431,990 B1 | 8/2002 | Manwaring |
| 6,441,745 B1 | 8/2002 | Gates |
| D465,251 S | 11/2002 | Wood et al. |
| 6,506,126 B1 | 1/2003 | Goodman |
| 6,558,271 B1 | 5/2003 | Beach et al. |
| 6,561,917 B2 | 5/2003 | Manwaring |
| 6,607,450 B1 | 8/2003 | Hackman |
| 6,634,956 B1 | 10/2003 | Pegg |
| 6,638,175 B2 | 10/2003 | Lee et al. |
| 6,648,769 B2 | 11/2003 | Lee et al. |
| 6,652,390 B2 | 11/2003 | Bradford |
| 6,663,503 B1 | 12/2003 | Kenmi |
| 6,676,533 B1 | 1/2004 | Hsien |
| 6,767,292 B1 | 7/2004 | Skalla, Sr. |
| D498,508 S | 11/2004 | Antonious |
| 6,819,247 B2 | 11/2004 | Birnbach et al. |
| 6,821,209 B2 | 11/2004 | Manwaring et al. |
| 6,837,800 B2 | 1/2005 | Rollinson et al. |
| 6,876,947 B1 | 4/2005 | Darley et al. |
| 6,878,071 B2 | 4/2005 | Schwieger et al. |
| 6,882,955 B1 | 4/2005 | Ohlenbusch et al. |
| 6,929,558 B2 | 8/2005 | Manwaring et al. |
| 6,991,552 B2 | 1/2006 | Burke |
| 6,991,555 B2 | 1/2006 | Reese |
| 7,018,304 B2 | 3/2006 | Bradford |
| 7,041,014 B2 | 5/2006 | Wright et al. |
| 7,070,515 B1 | 7/2006 | Liu |
| 7,125,340 B1 | 10/2006 | Priester |
| 7,147,569 B2 | 12/2006 | Tang et al. |
| 7,160,200 B2 | 1/2007 | Grober |
| 7,163,470 B2 | 1/2007 | Galloway et al. |
| 7,201,668 B1 | 4/2007 | Pamias |
| 7,255,653 B2 | 8/2007 | Saso |
| 7,264,554 B2 | 9/2007 | Bentley |
| 7,264,555 B2 | 9/2007 | Lee et al. |
| 7,297,073 B2 | 11/2007 | Jung |
| 7,326,121 B2 | 2/2008 | Roake |
| 7,351,157 B2 | 4/2008 | Priester |
| 7,396,289 B2 | 7/2008 | Soracco et al. |
| 7,407,443 B2 | 8/2008 | Franklin et al. |
| 7,431,660 B2 | 10/2008 | Hasegawa |
| 7,431,663 B2 | 10/2008 | Pamias |
| 7,509,842 B2 | 3/2009 | Kostuj |
| 7,520,820 B2 | 4/2009 | Dimarco |
| 7,602,301 B1 | 10/2009 | Stirling et al. |
| 7,621,820 B2 | 11/2009 | Clausen et al. |
| 7,627,451 B2 | 12/2009 | Vock et al. |
| 7,647,071 B2 | 1/2010 | Rofougaran |
| 7,691,004 B1 | 4/2010 | Lueders |
| 7,713,138 B2 | 5/2010 | Sato et al. |
| 7,717,803 B2 | 5/2010 | DiMarco |
| 7,722,478 B2 | 5/2010 | Ebner |
| 7,736,242 B2 | 6/2010 | Stites et al. |
| 7,758,452 B2 | 7/2010 | Soracco |
| 7,766,760 B2 | 8/2010 | Priester |
| 7,771,263 B2 | 8/2010 | Telford |
| 7,771,285 B2 | 8/2010 | Porter |
| 7,771,290 B2 * | 8/2010 | Bezilla et al. ................ 473/335 |
| 7,780,535 B2 | 8/2010 | Hagood et al. |
| 7,789,742 B1 | 9/2010 | Murdock et al. |
| 7,800,480 B1 | 9/2010 | Joseph et al. |
| 7,801,575 B1 | 9/2010 | Balardeta et al. |
| 7,803,066 B2 | 9/2010 | Solheim et al. |
| 7,804,404 B1 | 9/2010 | Balardeta et al. |
| 7,811,182 B2 | 10/2010 | Ligotti, III et al. |
| 7,821,407 B2 | 10/2010 | Shears et al. |
| 7,825,815 B2 | 11/2010 | Shears et al. |
| 7,831,212 B1 | 11/2010 | Balardeta et al. |
| 7,837,574 B2 | 11/2010 | Brunner |
| 7,837,575 B2 | 11/2010 | Lee et al. |
| 7,846,036 B2 | 12/2010 | Tanaka |
| 7,853,211 B1 | 12/2010 | Balardeta et al. |
| 7,857,705 B1 | 12/2010 | Galloway |
| 7,871,336 B2 | 1/2011 | Breier et al. |
| 7,878,924 B2 | 2/2011 | Clausen et al. |
| 7,883,428 B1 | 2/2011 | Balardet et al. |
| 7,887,440 B2 | 2/2011 | Wright et al. |
| 7,892,102 B1 | 2/2011 | Galloway |
| 7,918,745 B2 | 4/2011 | Morris et al. |
| 7,922,596 B2 | 4/2011 | Vanderbilt et al. |
| 7,922,603 B2 | 4/2011 | Boyd et al. |
| 7,941,097 B1 | 5/2011 | Balardeta et al. |
| 7,946,926 B1 | 5/2011 | Balardeta et al. |
| 7,957,767 B2 | 6/2011 | Rofougaran |
| 7,959,519 B2 | 6/2011 | Zielke et al. |
| 7,967,699 B2 | 6/2011 | Soracco |
| 7,978,081 B2 | 7/2011 | Shears et al. |
| 7,993,211 B2 | 8/2011 | Bardha |
| 7,993,213 B1 | 8/2011 | D'Eath |
| 8,025,586 B2 | 9/2011 | Teramoto |
| 8,052,539 B2 | 11/2011 | Kimber |
| 8,074,495 B2 | 12/2011 | Kostuj |
| 8,092,316 B2 | 1/2012 | Breier et al. |
| 8,100,779 B2 | 1/2012 | Solheim et al. |
| 8,105,175 B2 | 1/2012 | Breier et al. |
| 8,117,903 B2 | 2/2012 | Golden et al. |
| 8,177,661 B2 | 5/2012 | Beach et al. |
| 8,226,495 B2 | 7/2012 | Savarese et al. |
| 8,251,836 B2 | 8/2012 | Brandt |
| 8,272,974 B2 | 9/2012 | Mickelson et al. |
| 8,282,506 B1 | 10/2012 | Holt |
| 8,308,583 B2 | 11/2012 | Morris et al. |
| 8,330,284 B2 | 12/2012 | Weston et al. |
| 8,337,335 B2 | 12/2012 | Dugan |
| 8,353,782 B1 | 1/2013 | Beach et al. |
| D675,691 S | 2/2013 | Oldknow et al. |
| D676,512 S | 2/2013 | Oldknow et al. |
| D676,909 S | 2/2013 | Oldknow et al. |
| D676,913 S | 2/2013 | Oldknow et al. |
| D676,914 S | 2/2013 | Oldknow et al. |
| D676,915 S | 2/2013 | Oldknow et al. |
| D677,353 S | 3/2013 | Oldknow et al. |
| 8,593,286 B2 | 11/2013 | Razoumov et al. |
| 8,696,450 B2 * | 4/2014 | Rose et al. ................ 463/30 |
| 8,715,096 B2 * | 5/2014 | Cherbini ................ 473/219 |
| 2001/0005695 A1 | 6/2001 | Lee et al. |
| 2001/0041628 A1 | 11/2001 | Thorne et al. |
| 2001/0053720 A1 | 12/2001 | Lee et al. |
| 2002/0052246 A1 | 5/2002 | Burke |
| 2002/0077189 A1 | 6/2002 | Tuer et al. |

(56) References Cited

U.S. PATENT DOCUMENTS

| | | |
|---|---|---|
| 2002/0107085 A1 | 8/2002 | Lee et al. |
| 2002/0123386 A1 | 9/2002 | Perlmutter |
| 2002/0160848 A1 | 10/2002 | Burke |
| 2002/0173364 A1 | 11/2002 | Boscha |
| 2002/0173365 A1 | 11/2002 | Boscha |
| 2002/0183657 A1 | 12/2002 | Socci et al. |
| 2003/0009913 A1 | 1/2003 | Potter et al. |
| 2003/0040380 A1 | 2/2003 | Wright et al. |
| 2003/0045371 A1 | 3/2003 | Wood |
| 2003/0054900 A1 | 3/2003 | Tindale |
| 2003/0207718 A1 | 11/2003 | Perlmutter |
| 2004/0106460 A1 | 6/2004 | Lee et al. |
| 2004/0142603 A1 | 7/2004 | Walker |
| 2004/0177531 A1 | 9/2004 | Dibenedetto et al. |
| 2004/0204257 A1 | 10/2004 | Boscha |
| 2004/0225199 A1 | 11/2004 | Evanyk et al. |
| 2004/0259651 A1 | 12/2004 | Storek |
| 2005/0017454 A1 | 1/2005 | Endo et al. |
| 2005/0032582 A1 | 2/2005 | Mahajan et al. |
| 2005/0037862 A1 | 2/2005 | Hagood et al. |
| 2005/0054457 A1 | 3/2005 | Eyestone et al. |
| 2005/0079922 A1 | 4/2005 | Priester |
| 2005/0137024 A1 | 6/2005 | Stites et al. |
| 2005/0215340 A1 | 9/2005 | Stites et al. |
| 2005/0227775 A1 | 10/2005 | Cassady et al. |
| 2005/0261073 A1 | 11/2005 | Farrington et al. |
| 2005/0288119 A1 | 12/2005 | Wang et al. |
| 2006/0025229 A1 | 2/2006 | Mahajan et al. |
| 2006/0029916 A1 | 2/2006 | Boscha |
| 2006/0040765 A1 | 2/2006 | Sano |
| 2006/0052173 A1 | 3/2006 | Telford |
| 2006/0063600 A1 | 3/2006 | Grober |
| 2006/0084516 A1 | 4/2006 | Eyestone et al. |
| 2006/0090549 A1 | 5/2006 | Kostuj |
| 2006/0094520 A1 | 5/2006 | Kostuj |
| 2006/0094524 A1 | 5/2006 | Kostuj |
| 2006/0105849 A1 | 5/2006 | Brunner |
| 2006/0105857 A1 | 5/2006 | Stark |
| 2006/0166737 A1 | 7/2006 | Bentley |
| 2006/0166738 A1 | 7/2006 | Eyestone et al. |
| 2006/0183564 A1 | 8/2006 | Park |
| 2006/0184336 A1 | 8/2006 | Kolen |
| 2006/0224306 A1 | 10/2006 | Workman et al. |
| 2006/0276256 A1 | 12/2006 | Storek |
| 2006/0287118 A1 | 12/2006 | Wright et al. |
| 2007/0010341 A1 | 1/2007 | Miettinen et al. |
| 2007/0011919 A1 | 1/2007 | Case |
| 2007/0111811 A1 | 5/2007 | Grober |
| 2007/0149309 A1 | 6/2007 | Ford |
| 2007/0225085 A1 | 9/2007 | Koide et al. |
| 2007/0238538 A1 | 10/2007 | Priester |
| 2007/0270214 A1 | 11/2007 | Bentley |
| 2008/0009360 A1 | 1/2008 | Purtill |
| 2008/0051208 A1 | 2/2008 | Lee et al. |
| 2008/0076580 A1 | 3/2008 | Murdock et al. |
| 2008/0085778 A1 | 4/2008 | Dugan |
| 2008/0125239 A1 | 5/2008 | Clausen et al. |
| 2008/0125288 A1 | 5/2008 | Case |
| 2008/0146370 A1 | 6/2008 | Beach et al. |
| 2008/0171610 A1 | 7/2008 | Shin |
| 2008/0188310 A1 | 8/2008 | Murdock et al. |
| 2008/0200275 A1 | 8/2008 | Wagen et al. |
| 2008/0218343 A1 | 9/2008 | Lee et al. |
| 2008/0242354 A1 | 10/2008 | Rofougaran |
| 2008/0287205 A1 | 11/2008 | Katayama |
| 2009/0018795 A1 | 1/2009 | Priester |
| 2009/0048070 A1 | 2/2009 | Vincent et al. |
| 2009/0111602 A1 | 4/2009 | Savarese et al. |
| 2009/0120197 A1 | 5/2009 | Golden et al. |
| 2009/0131190 A1 | 5/2009 | Kimber |
| 2009/0131191 A1 | 5/2009 | Priester et al. |
| 2009/0163285 A1 | 6/2009 | Kwon et al. |
| 2009/0163294 A1 | 6/2009 | Cackett et al. |
| 2009/0165530 A1 | 7/2009 | Golden et al. |
| 2009/0165531 A1 | 7/2009 | Golden et al. |
| 2009/0186717 A1 | 7/2009 | Stites et al. |
| 2009/0203460 A1 | 8/2009 | Clark |
| 2009/0209358 A1 | 8/2009 | Niegowski |
| 2009/0221380 A1 | 9/2009 | Breier et al. |
| 2009/0221381 A1 | 9/2009 | Breier et al. |
| 2009/0247312 A1 | 10/2009 | Sato et al. |
| 2009/0254204 A1 | 10/2009 | Kostuj |
| 2009/0270743 A1 | 10/2009 | Dugan et al. |
| 2009/0286611 A1 | 11/2009 | Beach et al. |
| 2010/0035701 A1 | 2/2010 | Kusumoto |
| 2010/0048314 A1 | 2/2010 | Hsu et al. |
| 2010/0049468 A1 | 2/2010 | Papadourakis |
| 2010/0067566 A1 | 3/2010 | Rofougaran |
| 2010/0069171 A1 | 3/2010 | Clausen et al. |
| 2010/0093457 A1 | 4/2010 | Ahern et al. |
| 2010/0093458 A1 | 4/2010 | Davenport et al. |
| 2010/0093463 A1 | 4/2010 | Davenport et al. |
| 2010/0099509 A1 | 4/2010 | Ahem et al. |
| 2010/0113174 A1 | 5/2010 | Ahern |
| 2010/0113183 A1 | 5/2010 | Soracco |
| 2010/0117837 A1 | 5/2010 | Stirling et al. |
| 2010/0121227 A1 | 5/2010 | Stirling et al. |
| 2010/0121228 A1 | 5/2010 | Stirling et al. |
| 2010/0130298 A1 | 5/2010 | Dugan et al. |
| 2010/0144455 A1 | 6/2010 | Ahern |
| 2010/0144456 A1 | 6/2010 | Ahern |
| 2010/0190573 A1 | 7/2010 | Boyd |
| 2010/0197423 A1 | 8/2010 | Thomas et al. |
| 2010/0197426 A1 | 8/2010 | De La Cruz et al. |
| 2010/0201512 A1 | 8/2010 | Stirling et al. |
| 2010/0210371 A1 | 8/2010 | Sato et al. |
| 2010/0216563 A1 | 8/2010 | Stites et al. |
| 2010/0216564 A1 | 8/2010 | Stites et al. |
| 2010/0216565 A1 | 8/2010 | Stites et al. |
| 2010/0222152 A1 | 9/2010 | Jaekel et al. |
| 2010/0255922 A1 | 10/2010 | Lueders |
| 2010/0273569 A1 | 10/2010 | Soracco |
| 2010/0292024 A1 | 11/2010 | Hagood et al. |
| 2010/0304877 A1 | 12/2010 | Iwahashi et al. |
| 2010/0308105 A1 | 12/2010 | Savarese et al. |
| 2011/0028230 A1 | 2/2011 | Balardeta et al. |
| 2011/0081978 A1 | 4/2011 | Murdock et al. |
| 2011/0082571 A1 | 4/2011 | Murdock et al. |
| 2011/0087344 A1 | 4/2011 | Murdock et al. |
| 2011/0092260 A1 | 4/2011 | Murdock et al. |
| 2011/0092310 A1 | 4/2011 | Breier et al. |
| 2011/0098127 A1 | 4/2011 | Yamamoto |
| 2011/0098128 A1 | 4/2011 | Clausen et al. |
| 2011/0130223 A1 | 6/2011 | Murdock et al. |
| 2011/0151977 A1 | 6/2011 | Murdock et al. |
| 2011/0195798 A1 | 8/2011 | Sander et al. |
| 2011/0212757 A1 | 9/2011 | Murdock et al. |
| 2011/0224011 A1 | 9/2011 | Balardeta et al. |
| 2011/0224025 A1 | 9/2011 | Balardeta et al. |
| 2011/0256951 A1 | 10/2011 | Soracco et al. |
| 2011/0256954 A1 | 10/2011 | Soracco |
| 2011/0281621 A1 | 11/2011 | Murdock et al. |
| 2012/0019140 A1 | 1/2012 | Maxik et al. |
| 2012/0052972 A1 | 3/2012 | Bentley |
| 2012/0120572 A1 | 5/2012 | Bentley |
| 2012/0122601 A1 | 5/2012 | Beach et al. |
| 2012/0165110 A1 | 6/2012 | Cheng |
| 2012/0165111 A1 | 6/2012 | Cheng |
| 2012/0191405 A1 | 7/2012 | Molyneux et al. |
| 2012/0302366 A1 | 11/2012 | Murphy |
| 2014/0018184 A1* | 1/2014 | Bezilla et al. .............. 473/335 |

FOREIGN PATENT DOCUMENTS

| | | |
|---|---|---|
| EP | 2377586 A2 | 10/2011 |
| GB | 2422554 A | 8/2006 |
| JP | 07-255886 A | 10/1995 |
| JP | 10305119 | 11/1998 |
| JP | 2000271253 A | 10/2000 |
| JP | 2002306647 A | 10/2002 |
| JP | 2006223701 A | 8/2006 |
| JP | 2007209722 A | 8/2007 |
| JP | 2008036315 A | 2/2008 |
| JP | 2009201744 A | 9/2009 |

(56) References Cited

FOREIGN PATENT DOCUMENTS

| WO | 0215993 | 2/2002 |
|---|---|---|
| WO | 2004056425 | 8/2004 |
| WO | 2005005842 A1 | 1/2005 |
| WO | 2005035073 A1 | 4/2005 |
| WO | 2005058427 A2 | 6/2005 |
| WO | 2005079933 A1 | 9/2005 |
| WO | 2005094953 | 10/2005 |
| WO | 2005118086 | 12/2005 |
| WO | 2009091636 A1 | 7/2009 |
| WO | 2010090814 A1 | 8/2010 |
| WO | 2012027726 | 3/2012 |
| WO | 2012149385 A1 | 11/2012 |

OTHER PUBLICATIONS

Office Action dated Feb. 8, 2013 for U.S. Appl. No. 13/250,051.
International Search Report and Written Opinion recevied in corresponding PCT Application No. PCT/US2010/021355 issued on Jul. 7, 2010.
Invitation to Pay Additional Fees and Partial Search Report received in corresponding PCT Application No. PCT/US2010/021355 issued on Apr. 12, 2010.
International Search Report and Written Opinion issued Sep. 9, 2011 in corresponding PCT Application No. PCT/US2011/023678.
PCT/US2013/025615, International Search Report and Written Opinion mailed Aug. 14, 2013.
International Search Report in related International Application No. PCT/US2012/03542; dated Sep. 10, 2012.
United States Golf Association; Procedure for Measuring the Flexibility of a Golf Clubhead, USGA-TPX3004; Revision 1.0.0; May 1, 2008; p. 1-11.
International Search Report in International Application No. PCT/US2013/043656; dated Aug. 2, 2013.
International Search Report and Written Opinion issued Jul. 31, 2013 in corresponding PCT Application No. PCT/U52013/043700.
International Search Report and Written Opinion mailed Sep. 4, 2014 for PCT Application No. PCT/US2014/029044.

* cited by examiner

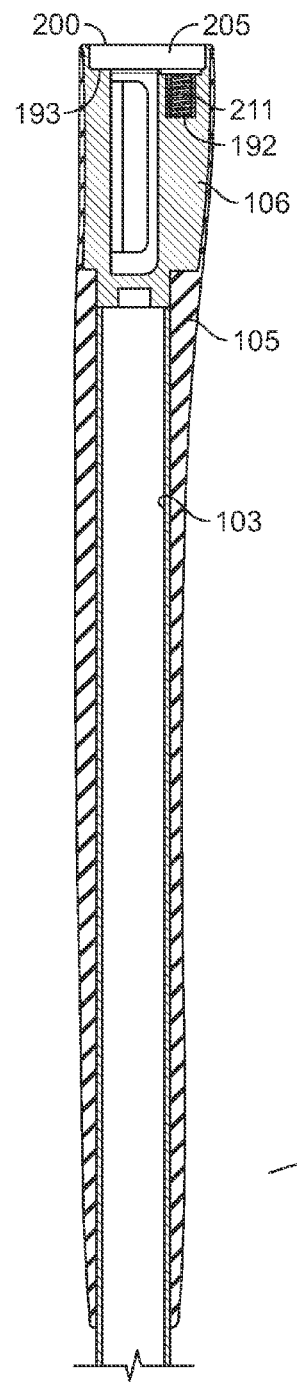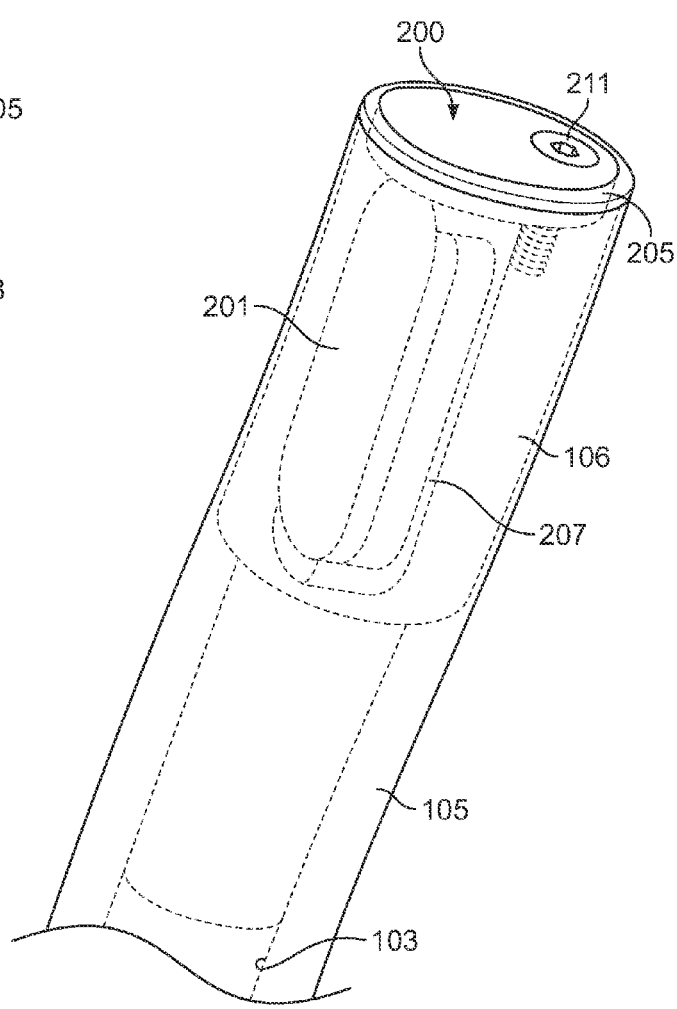
FIG. 31
FIG. 32

GOLF CLUBS AND GOLF CLUB HEADS

CROSS-REFERENCE TO RELATED APPLICATIONS

This application claims priority to and the benefit of U.S. Provisional Application Ser. No. 61/665,834, filed Jun. 28, 2012, and this application is a continuation in part of U.S. patent application Ser. No. 13/250,051, filed Sep. 30, 2011, which, in turn, claims priority to U.S. Provisional Application Ser. No. 61/480,322, filed Apr. 28, 2011, and this application also claims priority to U.S. Provisional Application Ser. No. 61/653,771, filed May 31, 2012, all of which applications are hereby incorporated by reference in their entireties and made part hereof.

FIELD OF THE DISCLOSURE

The present disclosure relates to golf clubs and golf club heads. Particular example aspects of this disclosure relate to the golf clubs and golf club heads which may include monitoring devices for monitoring aspects of a golfer's swing or overall golf game.

BACKGROUND

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well known golf superstars, at least in part, have increased golf's popularity in recent years, both in the United States and across the world.

Golfers at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. A host of swing and/or teaching aids also are available on the market that promise to help lower one's golf scores.

Being the sole instrument that sets a golf ball in motion during play, golf clubs also have been the subject of much technological research and advancement in recent years. For example, the market has seen dramatic changes and improvements in putter designs, golf club head designs, shafts, and grips in recent years. Additionally, other technological advancements have been made in an effort to better match the various elements and/or characteristics of the golf club and characteristics of a golf ball to a particular user's swing features or characteristics (e.g., club fitting technology, ball launch angle measurement technology, ball spin rates, etc.). Further technological advancement in golf club design has also involved the incorporation of various types of monitoring devices or sensors in the golf club. Many such designs, however, have been cumbersome and unreliable. In addition, further processing of the data recorded by the sensors has been limited or not performed in a suitable manner to be most useful to golfers.

While the industry has witnessed dramatic changes and improvements to golf equipment in recent years, there is room in the art for further advances in golf club technology. Thus, while golf equipment according to the prior art provide a number of advantageous features, they nevertheless have certain limitations. The present invention seeks to overcome certain of these limitations and other drawbacks of the prior art, and to provide new features not heretofore available.

SUMMARY OF THE DISCLOSURE

The following presents a general summary of aspects of the disclosure in order to provide a basic understanding of the disclosure and various aspects of it. This summary is not intended to limit the scope of the disclosure in any way, but it simply provides a general overview and context for the more detailed description that follows.

It would be advantageous to have the ability to monitor and analyze aspects of a golfer's golf game, such as a golfer's golf swing. For example, it would be beneficial to be able to monitor and analyze golf swings a golfer takes during practice (such as in a teaching facility or on a driving range) or golf swings a golfer takes while actually playing a round of golf on a golf course. Therefore, particular aspects of the disclosure are directed to a golf club which includes a monitoring device.

According to aspects of the disclosure, golf clubs may include a golf club head and a shaft configured to engage with the golf club head which includes a grip engaged with the shaft. The golf club may include a monitoring device, which may include a sensor and a transmitter. Additionally, the monitoring device may be configured to determine data related to the characteristics of a golf swing. Further, the monitoring device may be configured to transmit the data related to the characteristics of a golf swing to a remote computer.

According to aspects of the disclosure, the monitoring device may include one or more sensors for monitoring data related to aspects of a golfer's golf game (such as the golfer's golf swing) and a transmitter/transceiver configured to transmit such data. According to aspects of the disclosure, the transmitted data may be analyzed (as will be described in below) and used to aid a golfer in improving the golfer's abilities (e.g., the golfer's golf swing). It is noted that according to particular example aspects of the disclosure, other data (e.g., particular club data, on-course data (such as particular golf swings and the approximate location where the swings were taken on a golf course) may be monitored, transmitted and coordinated with the data regarding the aspects of a golfer's golf game (such as the golfer's golf swing) and analyzed as well. Further aspects of the disclosure may include sensing impact location on the golf club face upon a golfer impacting a golf ball during a golf swing. Communication of sensed data may be transmitted, wirelessly or via other means, to a remote location for further processing and display to the golfer.

According to aspects of the disclosure, various structures and embodiments may be configured to receive the monitoring device or another electronic module within a receptacle at the distal end of the shaft of a golf club head or other ball striking device.

BRIEF DESCRIPTION OF THE DRAWINGS

The present disclosure is illustrated by way of example and not limited in the accompanying figures, in which like reference numerals indicate similar elements throughout, and in which:

FIGS. 27-31 illustrate one method for assembling a receptacle configured to receive a monitoring device and a grip configured to receive a shaft;

FIG. 32 is a perspective view of the embodiment of a receptacle and grip shown in FIG. 31 according to an illustrative embodiment of the disclosure;

Figure 1:
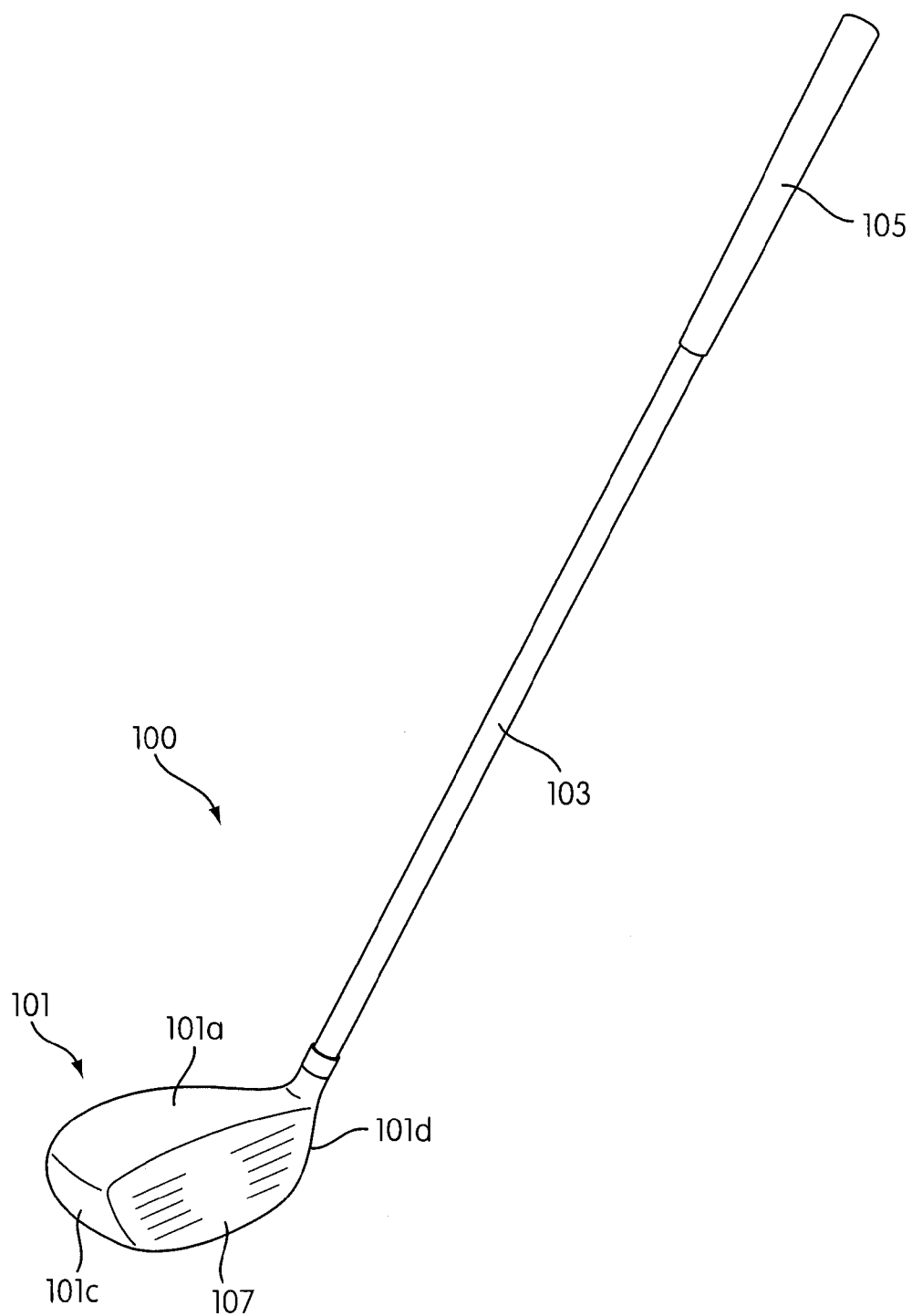
FIG. 1 is an illustrative embodiment of a wood-type golf club structure according to aspects of the disclosure.

The reader is advised that the various parts shown in these drawings are not necessarily drawn to scale.

DETAILED DESCRIPTION

The following description and the accompanying figures disclose features of golf club heads and golf clubs in accordance with examples of the present disclosure.

I. GENERAL DESCRIPTION OF EXAMPLE GOLF CLUB HEADS, GOLF CLUBS, AND METHODS IN ACCORDANCE WITH THIS DISCLOSURE

Aspects of this disclosure also relate to golf club shafts and golf club grips. Golf club shafts according to at least some example aspects of this disclosure may include: (a) a grip portion; and (b) a removable section which may include a monitoring device. The monitoring device according to at least some example aspects of this disclosure may also include: (c) one or more sensors and/or (d) a transmitter for transmitting data obtained by the one or more sensors. According to some aspects of the disclosure, the grip portion or other portion of the shaft may be configured to receive the removable section. Further, according to some aspects of the disclosure the golf club shaft (e.g., the grip portion) may be configured to receive the monitoring device directly, without a removable section. Golf club shafts of at least some example aspects of this disclosure may include metal shafts, carbon fiber shafts, etc. and be directed to any type of golf club, including wood-type golf clubs, iron-type golf clubs, putter type golf clubs, etc.

Additional aspects of this disclosure relate to golf club structures that include golf club shafts, e.g., of the types described above. Such golf club structures further may include one or more of: a shaft attached to the golf club head (optionally via a shaft engaging member (e.g., a hosel) or directly inserted otherwise engaged with the shaft); a grip or handle attached to the shaft; etc.

Still additional aspects of this disclosure relate to methods for producing golf club structures in accordance with examples of this disclosure. Such methods may include, for example, one or more of the following steps in any desired order and/or combinations: (a) providing a golf club head e.g., by manufacturing or otherwise constructing the golf club head body, by obtaining it from a third party source, etc.; (b) engaging a shaft of the various types described above (including any or all of the various structures, features, and/or arrangements described above) with the golf club head; and (c) engaging a grip of the various types described above (including any or all of the various structures, features, and/or arrangements described above) with the shaft.

Given the general description of various example aspects of the disclosure provided above, more detailed descriptions of various specific examples of golf clubs and golf club head structures according to the disclosure are provided below.

II. DETAILED DESCRIPTION OF EXAMPLE GOLF CLUB HEADS, GOLF CLUB STRUCTURES, AND METHODS ACCORDING TO THE DISCLOSURE

As discussed above, it would be advantageous to have the ability to monitor and analyze aspects of a golfer's golf game, such as a golfer's golf swing. Therefore, particular aspects of the disclosure are directed to a golf club which includes a monitoring device. According to aspects of the disclosure, the monitoring device may include one or more sensors for monitoring data related to aspects of a golfer's golf game (such as the golfer's golf swing) and a transmitter configured to transmit such data. It is further understood that the data may be further processed if necessary or desired. According to aspects of the disclosure, the transmitted data may be analyzed (as will be described in below) and used to aid a golfer in improving the golfer's abilities (e.g., the golfer's golf swing). It is noted that in according to particular example aspects of the disclosure, other data (e.g., particular club data, on the course data (such as particular golf swings and the approximate location where the swings were taken on a golf course) may be monitored, transmitted and analyzed as well.

Further, it would also be beneficial to configure the golf club such that the monitoring device is able to be removable from the golf club. For example, if a golfer wanted to use the monitoring device during practice (e.g., on a driving range) and did not want to use it during play on a golf course, it would be beneficial to have a golf club configured to allow the monitoring device to be easily engageable with, and removable from, the golf club in order to allow the golfer to selectively configure the golf club to their particular preference at a given time. If the golfer did not wish to use the monitoring device during an actual round of golf, the cartridge with monitoring device could be removed from the club and replaced with a replacement member without a monitoring device wherein the monitoring device had characteristics such as weighting and aerodynamic features so as to not change the overall characteristics of the golf club from when the monitoring device was installed on the golf club.

Therefore, aspects of the disclosure are directed to a golf club which is configured to receive and secure the monitoring device, and is also configured to release the monitoring device. For example, aspects of the disclosure relate to a golf club which includes a golf club shaft which is configured to receive and secure the monitoring device in the golf club shaft. For example, the grip of the golf club shaft may be configured to receive and secure the monitoring device in the grip of the golf club shaft. Further, example embodiments of the disclosure relate to a golf club shaft configured to receive and secure a removable section or a cartridge (e.g., a cartridge containing the monitoring device).

The following discussion and accompanying figures describe various example golf clubs and golf club shaft structures in accordance with the present disclosure. When the same reference number appears in more than one drawing, that reference number is used consistently in this specification and the drawings to refer to the same or similar parts throughout.

More specific examples and features of golf club structures according to this disclosure will be described in detail below in conjunction with the example golf club structures illustrated in FIGS. 1-32.

FIG. 1 generally illustrates an example of a wood-type golf club 100 according to aspects of the disclosure. As seen in FIG. 1, the wood-type golf club may include a wood-type golf club head 101 in accordance with the present disclosure.

In addition to the golf club head 101, the overall golf club structure 100 may include a shaft 103 and a grip or handle 105 attached to the shaft 103. The shaft 103 may be received in, engaged with, and/or attached to the golf club head 101 in any suitable or desired manner, including in conventional manners known and used in the art, without departing from the disclosure. As more specific examples, the shaft 103 may be engaged with the golf club head 101 through a shaft-receiving sleeve or element extending into the club head 101 (e.g., a hosel), and/or directly to the club head structure 101, e.g., via adhesives, cements, welding, soldering, mechanical connectors (such as threads, retaining elements, or the like). If desired, the shaft 103 may be connected to the golf club head 101 in a releasable manner using mechanical connectors to allow easy interchange of one shaft for another on the head. The shaft 103 may be made from any suitable or desired materials, including conventional materials known and used in the art, such as graphite based materials, composite or other non-metal materials, steel materials (including stainless steel), aluminum materials, other metal alloy materials, polymeric materials, combinations of various materials, and the like.

The grip or handle 105 may be attached to, engaged with, and/or extend from the shaft 103 in any suitable or desired manner, including in conventional manners known and used in the art, e.g., using adhesives or cements, etc. As another example, if desired, the grip or handle 105 may be integrally formed as a unitary, one-piece construction with the shaft 103. Additionally, any desired grip or handle materials may be used without departing from this disclosure, including, for example: rubber materials, leather materials, rubber or other materials including cord or other fabric material embedded therein, polymeric materials, and the like.

Further, according to aspects of the disclosure, the golf club 100 may include a hosel. According to aspects of the disclosure, the shaft 103 may be received in and/or inserted into and/or through the hosel. If desired, the hosel may be configured such that the shaft 103 may be engaged with the hosel in a releasable manner using mechanical connectors to allow easy interchange of one shaft for another on the head. For example, threads, locking mechanisms, etc. may be incorporated into the hosel and the end of the shaft 103 that is to be engaged with the hosel may be configured with a corresponding configuration. Also, the shaft 103 may be secured to the hosel via bonding with adhesives or cements, welding (e.g., laser welding), soldering, brazing, or other fusing techniques, etc. Further, optionally, if desired, the hosel may be eliminated and the shaft 103 may be directly attached to the golf club head 101. For example, the shaft 103 may be directly engaged with the golf club head 101 (e.g., by bonding with adhesives or cements, welding (e.g., laser welding), soldering, brazing, or other fusing techniques, etc.).

According to aspects of the disclosure, the golf club head 101 may include a ball striking face (e.g., a ball striking face which includes a face plate) 107. The ball striking face 107 may be provided integrally with the golf club head 101. Also, the ball striking face 107 may include a separate element, such as a face plate, which is configured to be engaged with the golf club head. For example, the golf club head may include a structure, such as a recess, notch or other configuration for receiving the face plate. The face plate may be engaged with the golf club head in a variety of ways. For example, the face plate may be engaged with the golf club head by press fitting, bonding with adhesives or cements, welding (e.g., laser welding), soldering, brazing, or other fusing techniques, mechanical connectors, etc.

The ball striking face 107 may be comprised of one or more materials. The material(s) of the ball striking face should be relatively durable to withstand the repeated impacts with the golf ball. For example, the ball striking face 107 may comprise a high strength steel. Further, other materials, such as titanium or other metals or alloys may be used as well. Further, the ball striking face 107 may include one or more score lines which extend generally horizontally across the ball striking face 107.

According to aspects of the disclosure, the golf club head may include a crown 101a, a sole 101b, a toe 01c, and a heel 101d. Further, the golf club head 101 may be constructed in any suitable or desired manner and/or from any suitable or desired materials without departing from this disclosure, including from conventional materials and/or in conventional manners known and used in the art. In fact, it is noted that wide varieties of overall club head constructions are possible without departing from this disclosure. For example, if desired, some or all of the various individual parts of the club head body described above may be made from multiple pieces that are connected together (e.g., by adhesives or cements; by welding, soldering, brazing, or other fusing techniques; by mechanical connectors; etc.). The various parts (e.g., crown, sole, face, etc.) may be made from any desired materials and combinations of different materials, including materials that are conventionally known and used in the art, such as metal materials, including lightweight metal materials (e.g., titanium, titanium alloys, aluminum, aluminum alloys, magnesium, magnesium alloys, etc.), composite materials, polymer materials, etc. The club head 101 and/or its various parts may be made by forging, casting, molding, machining, and/or using other techniques and processes, including techniques and processes that are conventional and known in the art.

It is noted that a wide variety of overall club head constructions are possible without departing from this disclosure. For example, it is noted that the dimensions and/or other characteristics of the golf club head 101 according to examples of this disclosure may vary significantly without departing from the disclosure. For example, the above described features and configurations may be incorporated into any wood-type club heads including, for example: wood-type hybrid clubs, fairway woods, drivers, etc.

Aspects of the disclosure are directed to a golf club which is configured to receive interchangeable sections or cartridges, wherein one of the interchangeable cartridges may house one or more sensors and/or a transmitter and a second of the interchangeable cartridges does not house a sensor and/or a transmitter, and may house one or more additional components. In this way, the golfer may selectively configure the golf club to include, or not include, the one or more sensors and/or the transmitter, at the golfer's discretion.

The monitoring device 201 may be configured to measure a multitude of different aspects of a golfer's golf game. For example, the monitoring device 201 may be configured to measure golf swing data. According to aspects of the disclosure, golf swing data may include information on a variety of different characteristics of a golf swing. Further, according to particular embodiments of the disclosure, the monitoring device 201 may also be configured to identify the particular golf club in which the sensor is positioned. For example, an RFID tag may be used. Further, according to particular embodiments of the disclosure, the monitoring device 201 may also be configured to identify a location where a particular golf swing was taken. For example, the monitoring device 201 may include Global Positioning Satellite (GPS) technology. Such information may be incorporated with maps of the golf course on which the golf shots were taken in order to provide a golfer with information on each shot during a round of golf. Some of these features will be described in further detail below.

Figure 2:
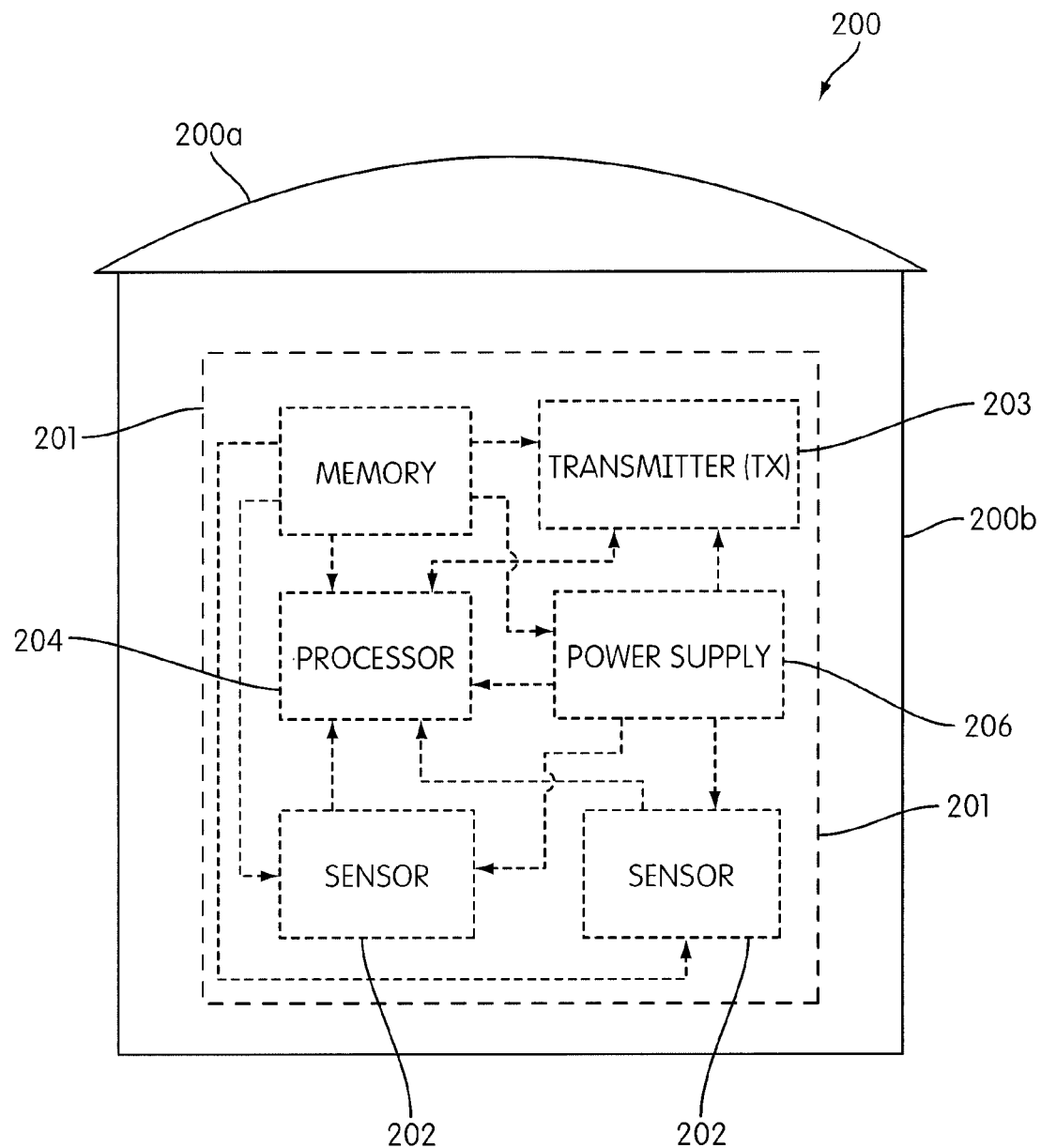
FIG. 2 is a cartridge according to an illustrative embodiment of the disclosure.

FIG. 2 illustrates one example of a monitoring device 201 that may be employed according to various examples of the disclosure to measure various aspects of a golfer's abilities and game. The monitoring device 201 may include a processor 204 for processing the electrical signals output by the sensors 202. With some implementations of the disclosure, the processor 204 may be a programmable microprocessor. For still other implementations of the invention, however, the processor 204 may be a purpose-specific circuit device, such as an ASIC. The processor 204 may be configured to perform any desired operation on the signals output from the sensors 202, such as curve smoothing, noise filtering, outlier removal, amplification, summation, integration, or the like. The processor 204 may be configured to provide the processed signals to transmitter 203 (or transceiver). Further, the monitoring device 201 may be configured to transmit the processed signals to a remote computer system 400 via the transmitter 203 (or transceiver), as will be discussed below. In one exemplary embodiment, the processed data may be transmitted wirelessly. The monitoring device 201 may also include a power supply 206, for providing power to the sensors 202, the processor 204, and the transmitter 203 (or transceiver) as needed. The power supply 206 may be, for example, a battery. Further, as discussed below, embodiments of the monitoring device 201 may include a memory (e.g., a flash memory). The memory may include both a read-only memory (ROM) and a random access memory (RAM). As will be appreciated by those of ordinary skill in the art, both the read-only memory (ROM) and the random access memory (RAM) may store software instructions for execution by the processor 204.

It is noted that while the depicted embodiment illustrates a processor 204, according to other aspects of the disclosure, the monitoring device 201 does not need to include a processor to process the data from the sensors 202. Instead, according to such aspects of the disclosure, the "raw" data from the sensors 202 may be transmitted, such as by wireless transmission, without being processed.

As discussed above, according to particular embodiments of the disclosure, the monitoring device 201 may be configured to measure golf swing data. Examples of golf swing data may include, the velocity of the golf club (or club head) during a golf swing, the acceleration of the club (or club head) during a golf swing, the angle of the golf club (or club head) during a golf swing (e.g., relative to one or more reference points), swing tempo, the impact of the ball with the golf club head during a golf swing, aspects of the impact of the ball with the golf club head during a golf swing (e.g., loft, etc.), etc. Further, the sensors may be configured to measure the position (e.g. a spatial position with regard to a particular frame of reference) of the golf club at various points in time in order to provide data on a golf swing. In this way, acceleration, velocity, positioning of the golf club may be determined and analyzed in 3 dimensions. Further, some or all of the above data may be leveraged to create a graphical representation (e.g., a picture or video) of the golf swing. For example, a swing path may be graphically represented in 3 dimensions along an X-Y-Z frame of reference. Further, areas of the "3D golf swing" during which acceleration is taking place may be represented differently than areas of constant velocity or deceleration. For example, high acceleration takes place may be shown in red, while areas in the swing path during which constant velocity or deceleration takes place may be shown in yellow.

According to aspects of the disclosure, the monitoring device 201 may include one or more sensors 202. It is noted that the sensors 202 may be accelerometers (such as piezoelectric accelerometers), magnetometers, or gyroscopes. Hence, a monitoring device 201 according to aspects of the disclosure may include an Inertial Measuring Unit (IMU) which includes one or more sensors (e.g., accelerometers and/or gyroscopes, or some combination thereof in an exemplary embodiment) that are configured to measure velocity, acceleration, orientation, gravitational forces, etc. Further, one skilled in the art will appreciate that numerous additional sensors may be used in connection with aspects of the disclosure (e.g., impact sensors, strain gauges, etc.). According to particular embodiments of the disclosure, the sensors 202 may be similar to sensors used in the NIKE+™ athletic performance monitoring systems available from NIKE, Inc. of Beaverton, Oreg. For example, the sensors 202 may measure golf swing data in a manner akin to the measurement of data in NIKE+™ athletic performance monitoring systems (e.g., speed information, such as velocity and acceleration information, etc.). According to aspects of the disclosure, the sensors 202 will produce electrical signals corresponding to the specific golfing characteristic it is monitoring. As known in the art, these signals can then be used to generate data representative of the golfing activity performed by the golfer.

Figure 3A:
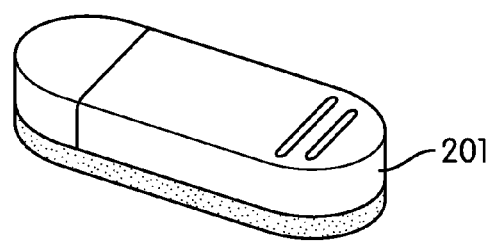
FIGS. 3A and 3B illustrate a monitoring device according to an illustrative embodiment of the disclosure.
Figure 3B:
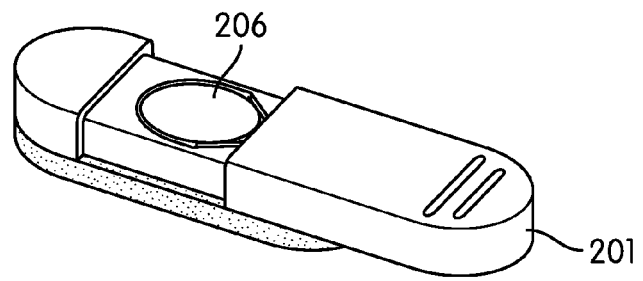

FIGS. 3A and 3B illustrate a particular embodiment of a monitoring device 201 according to aspects of the disclosure. As seen in FIGS. 3A and 3B, the monitoring device 201 may include a generally rectangular compartment in which sensors 202 are housed. The compartment may be similar to the compartment used to house sensors used in the NIKE+™ athletic performance monitoring systems available from NIKE, Inc. of Beaverton, Oreg. For example, according to aspects of the disclosure, the compartment may be rectangular with rounded ends and has a length in the range of 1.0-1.5 inches, a width of 0.4-1.0 inches and thickness of 0.2-0.45 inches. Other dimensions may be used as well. Further, the monitoring device 201 illustrated in FIGS. 4A-C may include three accelerometers, three gyroscopes and a magnetometer. Additionally, the monitoring device 201 illustrated in FIGS. 4A-C may include a transmitter 203 (or transceiver) for wirelessly transmitting data determined by the three accelerometers, three gyroscopes and a magnetometer.

According to aspects of the disclosure, the compartment of the monitoring device 201 may be made of plastic. It is noted that other materials may be used as well. The compartment of the monitoring device 201 may be opened to provide access to the sensors 202 and the other components housed inside the monitoring device 201. For example, as seen in FIGS. 3A and 3B, the compartment of the monitoring device 201 may include a cover which is configured to slide to provider access to various components of the monitoring device, such as the battery 206. Further, the compartment of the monitoring device 201 may house a circuit board or the like which may include various elements described above, such as the processor 204, sensors 202, transmitter 203, power supply 206, memory, etc.

Figure 4A:
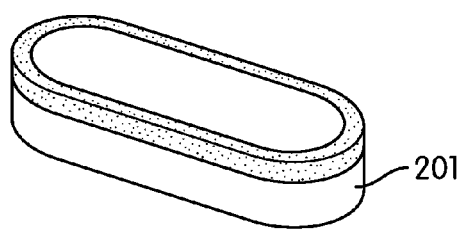
FIGS. 4A and 4B illustrate a monitoring device according to an illustrative embodiment of the disclosure.
Figure 4B:
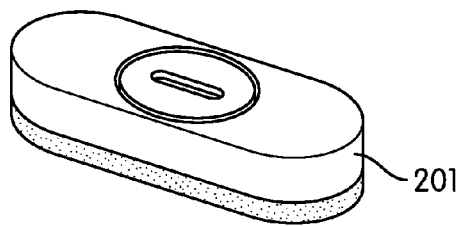
Figure 4C:
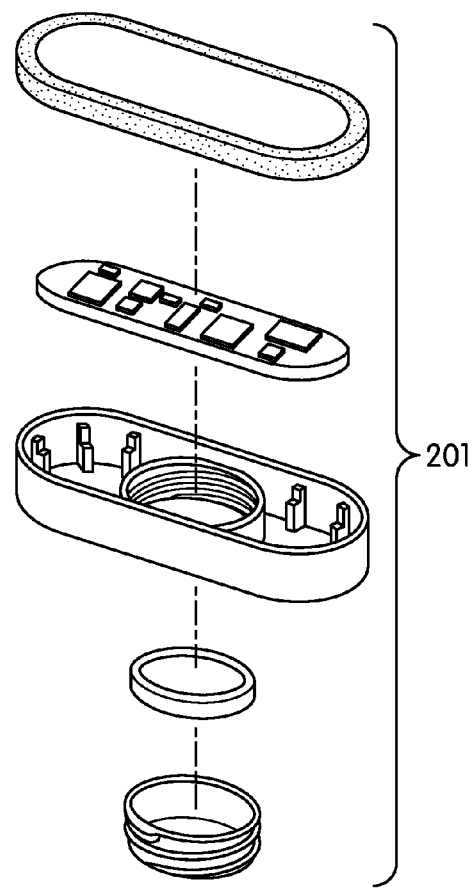
FIG. 4C is an exploded view of the monitoring device shown in FIGS. 4A and 4B.

FIGS. 4A-C illustrate a particular embodiment of the monitoring device 201. Specifically, FIG. 4A is a perspective view of the monitoring device 201. FIG. 4B is a perspective view of the bottom of the monitoring device 201. FIG. 4C is an exploded view of the monitoring device 201. As seen in FIGS. 4A-C, in the depicted embodiment, the monitoring device 201 includes a generally rectangular compartment in which sensors 202 are housed. The compartment may be similar to the compartment used to house sensors used in the NIKE+™ athletic performance monitoring systems available from NIKE, Inc. of Beaverton, Oreg. Further, the monitoring device 201 illustrated in FIGS. 4A-C may include three accelerometers, three gyroscopes and a magnetometer. Additionally, the monitoring device 201 illustrated in FIGS. 4A-C may include a transmitter 203 (or transceiver) for wirelessly transmitting data determined by the three accelerometers, three gyroscopes and a magnetometer.

According to aspects of the disclosure, the compartment of the monitoring device 201 may be made of plastic. It is noted that other materials may be used as well. As seen in FIG. 4C, the compartment of the monitoring device 201 may be opened to provide access to the sensors 202 and the other components housed inside the monitoring device 201. For example, as seen in FIG. 4B, the compartment of the monitoring device 201 may include a locking mechanism which allows the compartment to be unlocked and opened. As seen in FIG. 4C, the compartment of the monitoring device 201 may house a circuit board or the like which may include various elements described above, such as the processor 204, sensors 202, transmitter 203, power supply 206, memory, etc.

According to aspects of the disclosure, the monitoring device 201 may include an activation system. The activation system may be used for selectively activating the monitoring device 201 and/or at least some functions of the monitoring device 201 (e.g., data transmission/reception functions, data storage functions, data calculation functions, etc.). A wide variety of different activation systems may be used without departing from this disclosure.

For example, input from the activation system may be provided in any desired form or format without departing from the disclosure. As some more specific examples, if desired, the activation system may include a simple button, switch, or other input source that simply provides an activation or deactivation signal to the monitoring device 201 (e.g., a logical "1" or "0"). If desired, in at least some examples according to this disclosure, the activation system may activate the monitoring device 201, based on input it receives from the remote computer 400 (described below). For example a golfer may manually activate the monitoring device 201 by providing input (e.g., pressing a button) on the remote computer 400. Alternatively, the activation system may activate the monitoring device 201 automatically upon a certain action being performed. For example, when a golfer moves the club in which the monitoring device 201 is inserted, the activation system may induce the monitoring device 201 or its functions to operate. For example, if the monitoring device 201 includes an accelerometer and the golfer waggles the club (e.g., moves the club) over a predefined speed or length of time, the activation system may automatically activate the monitoring device 201 and/or at least some functions of the monitoring device 201 (e.g., data transmission/reception functions, data storage functions, data calculation functions, etc.). Further, the activation system may activate the monitoring device 201 when the golf club expands on impact (e.g., an impact with a golf ball). Further, it is noted that a monitoring device 201 may be configured to enter a sleep mode to conserve battery power if the monitoring device 201 is not used for a predetermined amount of time.

As discussed above, according to aspects of the disclosure, one of the sensors 202 may be an accelerometer. An accelerometer is a device used to measure acceleration. For example, an accelerometer may measure the magnitude and the direction of acceleration. An accelerometer according to aspects of the disclosure may include a three-axis accelerometer for measuring acceleration along three orthogonal axes. According to aspects of the disclosure, one or more accelerometers may be included in the golf club 100. For example, one or more accelerometers may be included in the monitoring device 201 or other a micro-electromechanical system (MEMS) configured to be engaged within the golf club shaft 103/grip 105.

According to aspects of the disclosure, the accelerometer may be configured to measure the velocity of the golf club 100 (e.g., club head 101, shaft 103, grip 105) during a golf swing, the acceleration of the club 100 (e.g., club head 101, shaft 103, grip 105) during a golf swing, etc.

According to aspects of the disclosure, one of the sensors 202 may be a magnetometer. A magnetometer is an instrument used to measure the strength and or the direction of a magnetic field around the instrument. According to aspects of the disclosure, one or more magnetometers may be included in the golf club 100. For example, one or more magnetometers may be included in the monitoring device 201 or other MEMS configured to be engaged within the golf club shaft 103/grip 105. According to other aspects of the disclosure, one or more magnetometers may also be used to determine golf swing parameters, e.g., using techniques incorporating the Earth's magnetic field as a reference, as shown and described in incorporated U.S. Provisional Application Ser. No. 61/665,834.

According to aspects of the disclosure, one of the sensors 202 may be a gyroscope. A gyroscope is a device used to measure orientation and rotation. For example, a gyroscope may measure orientation based on the principles of the conservation of angular momentum. Further, according to aspects of the disclosure, a three-axis gyroscope may be used to increase accuracy. When combined with an accelerometer, the combination of the gyroscope and the accelerometer may provide a more accurate indication of movement within a 3-D space when compare to an accelerometer alone. According to aspects of the disclosure, one or more gyroscopes may be included in the golf club 100. For example, one or more gyroscopes may be included in the monitoring device 201 or other MEMS configured to be engaged within the golf club shaft 103/grip 105.

According to aspects of the disclosure, the gyroscope 320 may be configured to determine golf swing parameters using techniques as shown and described in incorporated U.S. Provisional Application Ser. No. 61/665,834. For example, the gyroscope 320 may be used to determine: (1) the face angle of golf club head 101, e.g., as a function of the shaft rotation rate, (2) the club head speed, e.g., as a function of the radius (arm length plus club length) and angular velocity, (3) swing tempo, e.g., based on the angular velocity, (4) time of impact, e.g., based on the angular velocity, and/or (5) swing path, e.g., based on the rotational velocity, among other parameters. It is understood that data from other sensors (e.g., accelerometer, impact sensor, etc.) may also be used in such determinations, and that data from any of the sensors described above may be combined to make the determinations described herein.

Therefore, as demonstrated above, the monitoring device can determine various aspects of a golfer's golf swing, including: the velocity of the golf club (or club head) during a golf swing, the acceleration of the club (or club head) during a golf swing, the angle of the golf club (or club head) during a golf swing (e.g., relative to one or more reference points), swing tempo, the impact of the ball with the golf club head during a golf swing, etc.

As described above, the golf club 100 may include a transmitter 203. Further, it is noted that while a transmitter is the depicted embodiment, according to particular embodiments of the disclosure, the transmitter 203 may be a transceiver which is capable of receiving data as well as transmitting data. Data determined from each of the one or more sensors 202 may be communicated to the transmitter 203. For example, the one or more sensors 202 may be electrically connected to transmitter 203. Alternatively, data may be communicated wirelessly from the one or more sensors 201 to the transmitter 203. Regardless of how the data is communicated from the one or more sensors 202 to the transmitter 203, the transmitter 203 may be configured to transmit the data determined by the one or more sensors 202 to a remote computer system 400 (e.g., a portable computer device with a receiver configured to receive the data from the transmitter 203). While not shown, according to aspects of the disclosure, the monitoring device 201 may include a memory. The memory may be configured to store data from the one or more sensors 202. More specifically, the memory may store data while the golfing activity takes place and save it for later transmission to the remote computer system 400 (as discussed below).

While the data may be transmitted from the transmitter 202 in any desired manner, wireless type transmissions may be used in embodiments of the disclosure. Any desired wireless transmission system and method may be used without departing from the scope of the disclosure, including the use of any desired wireless data transmission format or protocol, including the transmission systems and protocols currently in use in NIKE+™ athletic performance monitoring systems. According to example aspects of the disclosure, the transmitter 203 may be configured to transmit data using a variety of conventional protocols. For example, the monitoring device 201 may be configured to communicate using the Bluetooth wireless communication protocol, so that it can be employed with Bluetooth-capable mobile telephones, personal digital assistants, watches or personal computers. Further, other methods of transmitting may be used as well, such as Bluetooth2, RFID, infrared transmission, cellular transmissions, etc.

Further, according to example aspects of the disclosure, the transmitter 203 may be configured to transmit data via an antenna. For example, in one embodiment of the invention, a ferrule is used as an antenna. The ferrule may be formed of a metal material or other type of antenna material. In another embodiment, shaft 103 may function as an antenna. An antenna may also be plated onto shaft 103, embedded under grip 105 or placed in any other location that does not interfere with a golf swing. The monitoring device 201 and the golf club head 101 may be configured such that a connection is made between the transmitter 203 and the antenna when the monitoring device 201 is engaged with the golf club head 101.

While wireless communication between the monitoring device 201 and the remote computer system 400 is described above, it is noted that any desired manner of communicating between the monitoring device 201 and the remote computer system 410 may be used without departing from the scope of the disclosure, including wired connections. For example, if desired, monitoring device 201 may include its own data storage system for storing data from the one or more sensors 202. Further, the monitoring device 201 may be configured to be engaged with the remote computer system 400 in order to transmit data to the remote computer 400. For example, monitoring device 201 may include an interface (e.g., a USB connection) configured to engage with a port of the remote computer system 400 in order to transmit data to the remote computer 400.

According to aspects of the disclosure, data collected from the sensors 202 may be stored during a practice session or a round of golf. Then, at a convenient time, such as after the practice session or round of golf, the golfer may disengage the monitoring device 201 from the golf club head and engage it with the remote computer system 400 in order to transmit the data to the remote computer system 400. Any type of connection system may be used without departing from the scope of the disclosure, including a wireless connection, a hardwired connection, connection via an input port (such as a USB port, or the like), etc.

Other data storage and/or transmission arrangements also are possible without departing from the scope of the invention. For example, any desired way of placing data derived from the physical data from the monitoring device 201 in the proper form or format for communication to the remote computer system 400 may be provided without departing from the invention. For example, as discussed above, the monitoring device 201 may include a receiver (e.g., the transmitter 203 may be a transceiver) which determines whether a transmission from transmitter 203 has been or is being received by the remote computer 400. If the transmission from transmitter 203 is not received by the remote computer 400, the monitoring device 201 may be configured to store the data on the memory (e.g., if the remote computer system 400 is not in range or is turned off). In this way, data collected by the sensors 202 will be stored locally so that it will not be lost and can be downloaded later to the remote computer system 400. It is noted that according to some aspects of the disclosure, the monitoring device 201 may be configured to transmit data to the remote computer system 400 (e.g., a portable computer system, such as a cellular telephone) and the remote computer system 400 may be configured to transmit data to a secondary computer system (such as a desktop computer) or a network, such as through a wired or wireless connection. In such a configuration, wherein the remote computer system 400 is portable, it could be used during play (e.g., at a practice session on a driving range or on the course during play) to give real time feedback to the golfer (e.g., during the round or practice session). Thereafter or in real-time, the data from the portable remote computer system 400 may be downloaded or uploaded to the secondary computer system for further analysis, storage, comparison, reference, presentation, etc., as shown and described in incorporated U.S. Provisional Application No. 61/665,834.

The remote computer system 400 may be any desired type of computer system, at any desired location, without departing from the scope of the disclosure. Several examples of different remote computer systems 400 are shown and described in incorporated U.S. Provisional Application Ser. No. 61/665,834. According to aspects of the disclosure, the remote computer system 400 may be, for example, portable audio and/or video players, cellular telephones, personal digital assistants, pagers, beepers, palm top computers, laptop computers, desktop computers, servers, or any type of computer controlled device, optionally a computer controlled device that generates or displays a human perceptible output and/or interface. These may include a processor system (which may include one or more processors or microprocessors, which may be configured to execute software instructions), a memory (which may include RAM and ROM and may be configured to store various software instructions for execution by the processor system), an output device (e.g., visual and/or audio output), a power supply, other user input devices, and/or a data transmission/reception system (e.g., a wireless receiver or transceiver), which may be configured to receive, from the transmitter 203, data/signals that correspond to the measured golfing parameter. It is understood that the processor system may be configured to process the data/signals from the monitoring device 201 in various manners.

It is noted that the above described monitoring system (which includes the monitoring device 201 and the remote computer system 400) may be configured to be active, real-time transmitting systems that provides data to the remote computer system 400 as the golf activity is taking place. Optionally, if desired, the remote computer system 400 may be configured to provide the golfer with real-time performance feedback (e.g., velocity of the golf club head, acceleration of the golf club head, the impact position of the golf ball on the ball striking face, path of the swing path of a particular swing, face angle of the ball striking face of the club head throughout the swing (e.g., during impact), etc.) while the golfing performance is taking place as shown and described in incorporated U.S. Provisional Application Ser. No. 61/665,834.

The monitoring device 201 and/or the computer system 400 may further include or be usable with any other component, feature, and/or function described in incorporated U.S. Provisional Application No. 61/665,834, in various embodiments, including without limitation: (1) strain gauges may be used in conjunction with the monitoring device 201 in order to provide measurements regarding the axial strain, bending moments or other characteristics of the shaft 103 or other features of the golf swing; (2) the monitoring device 201 may be configured to identify the particular golf club in which the monitoring device 201 is engaged, e.g., by using an RFID or other chip, by utilizing protrusions as described below, by using data collected on "practice" swings, etc.; (3) the monitoring device 201 and/or the computer system 400 may coordinate one or more characteristics of a particular golf shot with the identity of the particular golf club with which the shot was made, and such identity may also be utilized in calculating parameters (e.g., estimated shot distance) of the golf shot; (4) the monitoring device 201 may be "universal" with respect to all golf clubs in such a set of golf clubs and/or may be "universal" with respect to other types of ball striking devices, such as tennis racquets, bats (e.g., baseball, softball, cricket, etc.), hockey sticks (e.g., ice hockey, field hockey), lacrosse sticks, etc., and that club identification techniques described herein can be used for identification of other ball striking devices as well; (5) the processor 204 may be configured to receive data from each (or more than one) of the IMUs in the monitoring device 201 and compare that data with predetermined values or ranges to determine the data from which IMU to use for a particular purpose; (6) the monitoring device 201 may additionally or alternately identify a particular club or ball striking device using instructions received manually and/or from the computer system 400, or may use other means for such identification; (7) the particular IMU whose data is collected and used, the identity of the club or other piece of sports equipment with which the monitoring device 201 is engaged, the particular characteristics of the swing or stroke to be measured (e.g., based on such identity) may be chosen/dictated by the user through voice commands; (8) the monitoring device 201 may be activated in various ways, such as during insertion of the monitoring device 201 into sports equipment, manually, or automatically upon the occurrence of an event; (9) the monitoring device 201 may be continuously sensing and collecting data, or may be selectively activated/deactivated, such as by entering a "sleep" or "hibernation" state when the monitoring device has not been active for a predetermined amount of time; (10) the monitoring device 201 may be configured for distinguishing different types of movement, such as an actual swing, a practice swing or movement not related to the swing, and one such type of movement may be utilized for activation or deactivation as described above; (11) data from the monitoring device 201 may be used to provide recommendations to the golfer, such as by uploading to a network which can interpret the received data; (12) the remote computer 400 and/or another computer (e.g., over the network) may provide coaching or drills which will aid an athlete in improving various aspects of their games; and others described in the incorporated application.

According to aspects of the disclosure, data collected from the above described system and metrics determined by the above described system may be uploaded to a network for further processing. Additionally or alternatively, the remote computer 400 itself may be configured to compare the data and metrics with a predefined set of characteristics for further processing.

Figure 5:
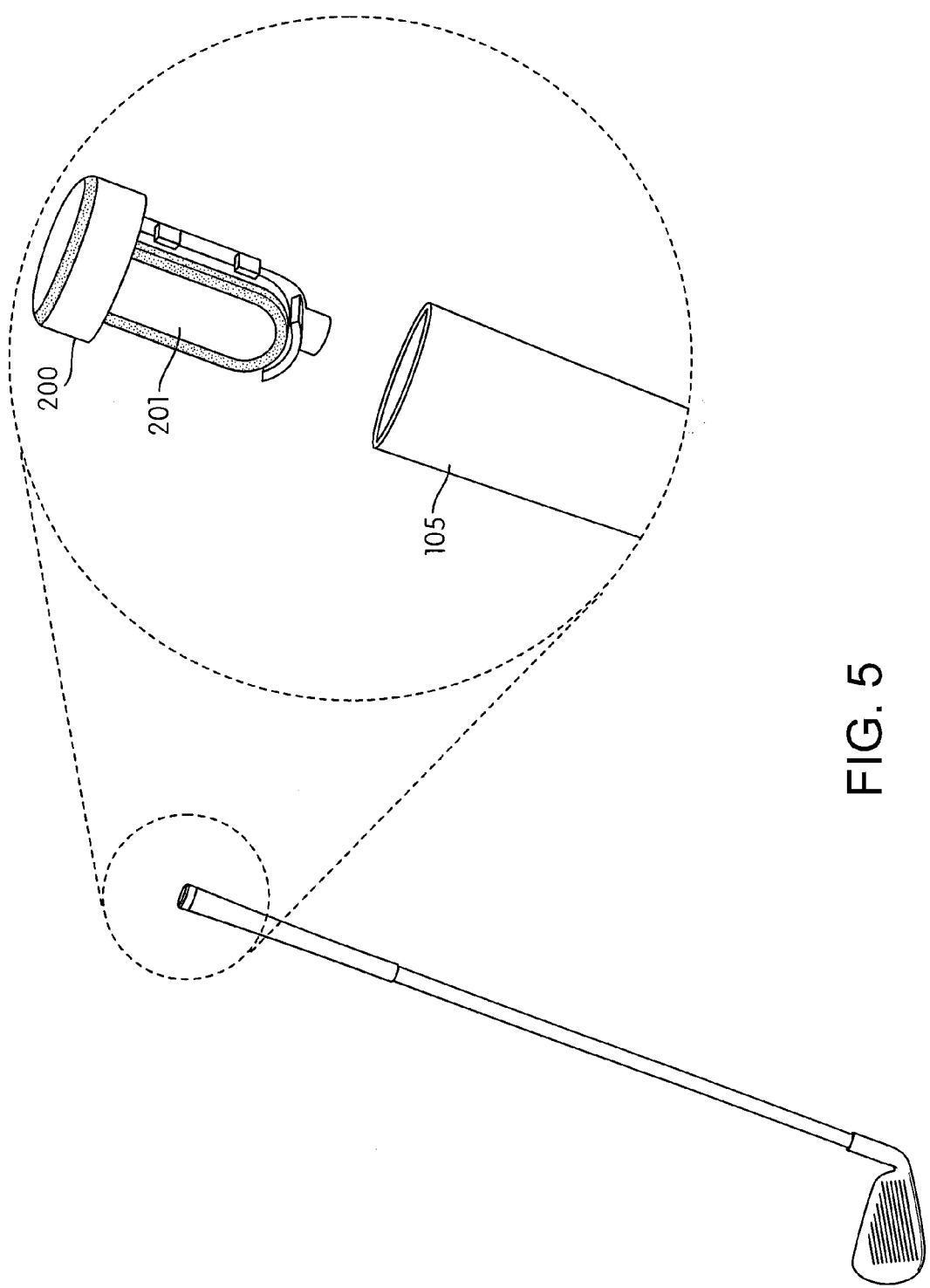
FIG. 5 is a perspective view of another embodiment of a golf club according to an illustrative embodiment of the disclosure, including an exploded view of a grip portion of the golf club having a cartridge supporting a monitoring device.

According to aspects of the disclosure, the shaft 103 and/or the grip 105 may be configured to receive a removable section or cartridge 200. Further, the removable section 200 may be configured to receive the monitoring device 201. FIG. 5 shows an illustrative embodiment of such aspects of the disclosure.

As seen in FIG. 5, the removable section 200 may include a circular portion which forms the top of the shaft and, also, an elongated portion configured to house the monitoring device 201. According to aspects of the disclosure, the elongated portion of the removable section 200 may include guides to aid in positioning and securing the monitoring device 201 within the removable section 200. It is noted that the removable section 200 may be configured to secure the monitoring device 201 in such a way that the monitoring device 201 does not move within the removable section 200. For example, the removable section 200 may be configured to engage with the monitoring device 201 (e.g., a compartment which includes the exterior of the monitoring device 201) via press fitting, snap fit mechanisms (e.g., spring loaded protrusions and corresponding detents), mechanical fasteners, etc. For example, the elongated portion may include a first arched end configured to engage a first rounded end of the compartment, a second arched end configured to engage a second rounded end of the compartment and a back portion which extends between the first arched portion and the second arched portion and is configured to engage a side of the compartment. In this way, the removable section 200 may be configured to support and stabilize the monitoring device 201. For example, the elongated portion may be configured to secure the compartment which may be rectangular with first and second rounded ends and have a length in the range of 1.0-1.5 inches, a width of 0.4-1.0 inches and thickness of 0.2-0.45 inches. According to aspects of the disclosure, the removable section 200 may be made of plastic. It is noted that other materials, such as rubber, or combinations thereof may be used as well.

Figure 33:
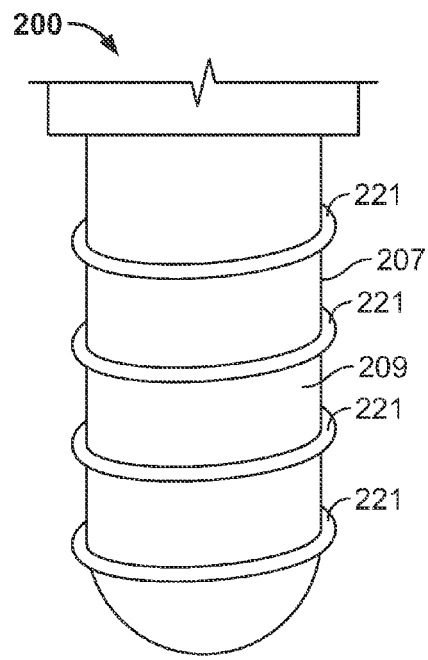
FIG. 33 is a rear view of the cartridge of FIG. 5, having flexible members disposed thereon.

The removable section or cartridge 200 may be configured to be engaged with the grip 105 in a variety of ways. For example, the grip 105 may be configured with an opening at its terminal end that is configured to receive the removable section 200. Further, the grip 105 may be configured with guides within the interior of the grip 105 that guide the removable section during insertion into the grip 105. Also, the grip may be configured with a locking mechanism, such as threads which line the interior of the grip 105. The removable section 200 may include a corresponding structure through which the removable section 200 is engaged and locked with the grip 105 upon twisting the removable section 200 into the grip 105. Alternatively, the removable section 200 may be configured to engage with the grip 105 via press fitting, snap fit mechanisms (e.g., spring loaded protrusions and corresponding detents), mechanical fasteners, etc. In one example embodiment, as shown in FIG. 33, the removable section 200 may have flexible members 221 positioned on the clip 207 that holds the monitoring device 201. The flexible members 221 are configured to engage the interior of the grip 105 and/or shaft 103 to retain the removable section 200 and the monitoring device 201 in place inside the grip 105. In the embodiment illustrated, the flexible members 221 are in the form of ridges that partially encircle the base 209 of the clip member 207, but may be configured differently in other embodiments. For example, the flexible members 221 may be configured as ridges that completely encircle a component, or may be configured as bumps or tabs on the exterior surface. In one embodiment, the flexible members 221 may be positioned at least on the areas of the removable section 200 that have the maximum dimension perpendicular to the direction of insertion into the grip 105/shaft 103. The flexible members 221 allow the removable cartridge 200 to be inserted into multiple grips having varying shaft diameters. This further allows the removable cartridge 200 to be used in different clubs or other sporting equipment. It is understood that other embodiments of removable cartridges 200 shown and described herein may include flexible members 221 for these purposes, including the removable cartridges illustrated in FIGS. 6, 10A-15, and 30-32. The flexible members 221 can be formed from a variety of materials known in the art, including rubber or polyurethane. In another embodiment, one or more fasteners (not shown) may be used to retain the cartridge 200 within the shaft 103, including the configuration described below and shown in FIG. 6 or other configurations.

Figure 6:
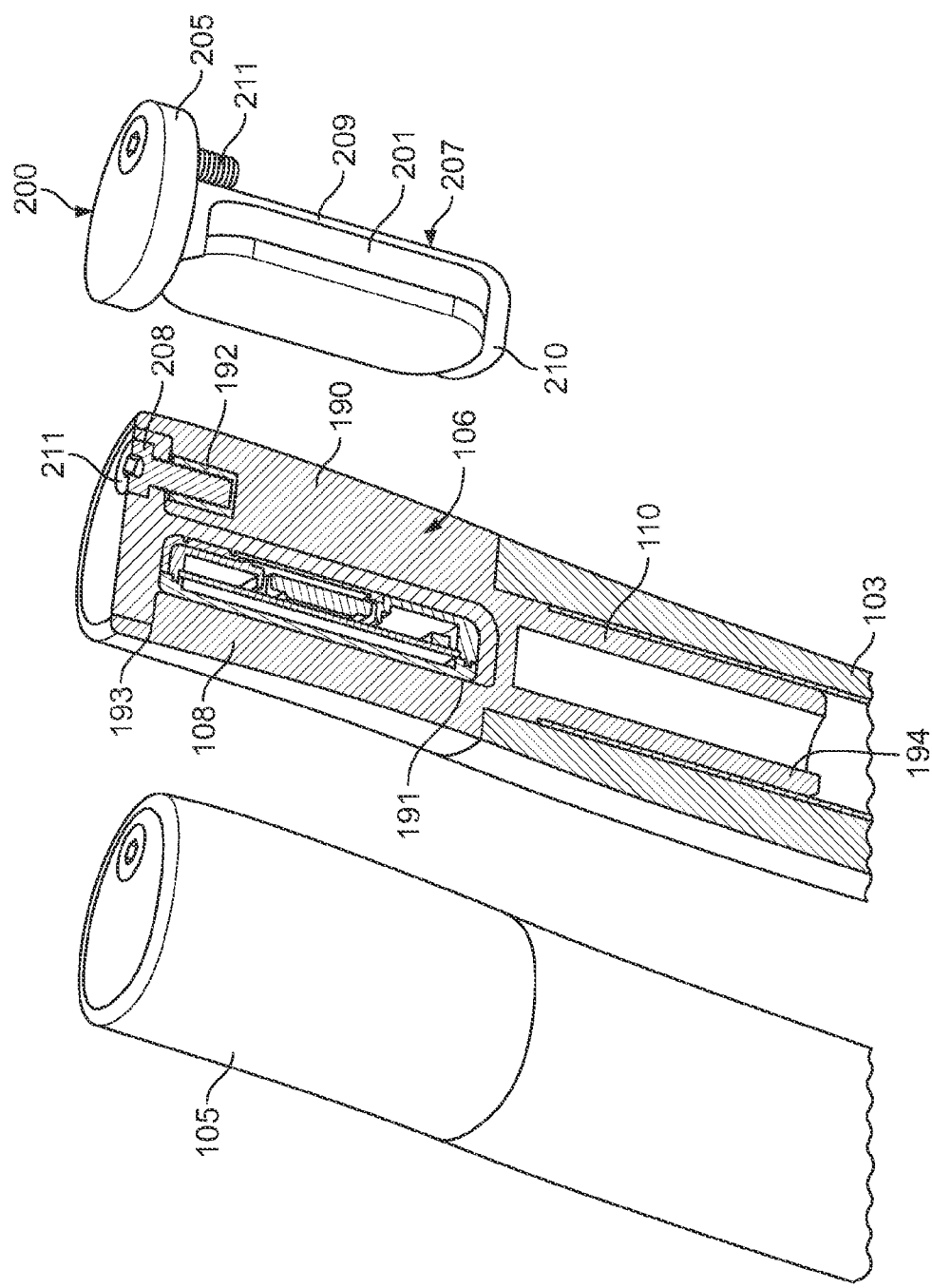
FIG. 6 is a perspective view of another embodiment of a golf club according to an illustrative embodiment of the disclosure, including an exploded view of a grip portion of the golf club configured to receive a monitoring device.

FIG. 6 illustrates an exploded view of another embodiment of a removable section or cartridge according to aspects of the disclosure. For example, as seen in FIG. 6, the cartridge 200 may be configured to fit within a top portion of the grip 105, or distal end of the grip 105. The top portion of the grip 105 may include a first portion which is configured to receive the cartridge supporting the monitoring device 201 and a second portion configured to engage with the interior of the shaft 103 of the golf club. Hence, the top portion of the grip 105 may be configured to removably fit within the golf club shaft 103. The removable top portion of the grip 105 and the cartridge 200 may be configured to be attached to each other as explained below.

Hence, in an exemplary embodiment as shown in FIG. 6, the top portion of the grip 105 may be considered a cartridge holder or a component receptacle 106. In this embodiment, the cartridge holder 106 defines a housing which is configured to receive components such as the monitoring device 201, the power source 206, and/or other components. The cartridge holder 106 generally includes a first portion 108 which is configured to receive the cartridge 200 supporting the monitoring device 201 and a second portion 110 configured to engage with the shaft 103 of the golf club.

The first portion 108 has a main body portion 190 having a first opening 191 therein and a second opening 192. The first opening 191 is generally an elongated slot that extends generally longitudinally into the main body portion 190. The first opening 191 can vary in length and width and is generally dimensioned to receive the portion of the cartridge 200 holding the monitoring device 201 as described in greater detail below. The first opening 191 is dimensioned such that there minimum play between the cartridge 200 and the main body portion 190, in one embodiment. The second opening 192 includes a connecting structure, such as threading, in an exemplary embodiment. The main body portion 190 further defines a recessed portion 193 at a distal end, and the first opening 191 and the second opening 192 open at the recessed portion 193. The second portion 110 is configured for engaging the shaft 103, and in the embodiment of FIG. 6, has a protrusion 194 that extends from the main body portion 190 of the first portion 108. The protrusion 194 may be hollow and is dimensioned to fit within and extend into the shaft 103. The protrusion 194 may engage the shaft 103 in another manner in other embodiments, or the cartridge holder 106 may include a different engaging structure. In one exemplary embodiment, the cartridge holder 106 is an integral member and can be formed from a variety of materials known in the art. In addition, an outer surface of the main body portion 190 may be formed with the material identical to the remaining portions of the grip member to provide a uniform surface as desired.

As further shown in FIG. 6, the removable cartridge 200 has a cap member 205 having a clip member 207 depending from the cap member 205. The cap member 205 has an orifice 208 extending therethrough and adjacent to the clip member 207. The clip member 207 has a base 209 and a resilient finger 210 extending generally transversely from the base 209 at the end opposite the cap member 205. The base 209 is dimensioned to accommodate the length of the monitoring device 201. The resilient finger 210 engages an end of the sensor 201. Thus, it is understood that the monitoring device 201 is inserted into the cartridge 200 wherein the monitoring device 201 is secured generally in an interference fit in this embodiment. One end of the monitoring device 201 is engaged by the resilient finger 210 and another end of the monitoring device 201 is engaged by an underside of the cap member 205. Accordingly, the monitoring device 201 can be snapped into the clip member 207. If desired, additional fingers or other retaining elements can be incorporated with the clip member 207, and the cartridge 200 and the monitoring device 201 may include complementary engaging structure, such as tabs and slots. For example, additional retaining elements may be employed when a longer base 209 is utilized thus spacing the sensor 201 further away from the cap member 205.

As further shown in FIG. 6, the cartridge holder 106 is secured to the shaft 103. The second portion 110 is inserted and secured to the shaft 103. This connection may be a permanent connection or a releasable connection. The removable cartridge 200 is inserted into the cartridge holder 106. The base 209 and finger 210 holding the monitoring device 201 are inserted into the first opening 191. The structure of the main body portion 190 surrounds and securely holds the cartridge 200 and thereby further protects the monitoring device 201 from damage due to impact or the elements. It is further understood that in this embodiment, the first opening 191 is generally non-circular wherein the clip member 207 holding the sensor 201 must be inserted into the first opening 191 in a set, fixed orientation. Further, with minimum play around the monitoring device 201, the position of the monitoring device 201 is always known. This aids in the ability to record and analyze data in a desired fashion.

As further shown in FIG. 6, the cartridge 200 and the top portion of the grip 105 may be configured to be fastened together by a threaded fastener 211 or other connection member. In this embodiment, the cap member 205 is received in the recessed portion 193. The cap member 205 is generally flush with the end of the cartridge holder 106. The orifice 208 on the cap member 205 is aligned with the second opening 192. A threaded fastener 211 is inserted through the orifice 208 and secured in the second opening 192 by threadable engagement. The second opening 192 may contain a threaded insert 195 to establish such engagement, as in the embodiment of FIG. 6, or may include integral threading or another connecting structure in another embodiment. Thus, removable cartridge 200 is thus secured in the grip of the club by a single fastener. It is understood that other fastening mechanisms could be utilized between the removable cartridge 200 and the cartridge holder 106, or otherwise the grip 105. The other fastening mechanisms include snap-fitting configurations or interference fittings as well as other mechanical configurations. With such configuration, the cartridge holder 106 holding the cartridge 200 is seamlessly integrated into the grip 105 and is virtually undetectable. The golf club appears like any traditional golf club that does not incorporate any sensor technology. Further, as seen in FIG. 6, the first portion of the grip 105 configured to receive the cartridge supporting the monitoring device 201 may be configured to surround and securely hold the cartridge 200 and thereby further protect the monitoring device 201 from damage due to impact or the elements.

Figure 11:
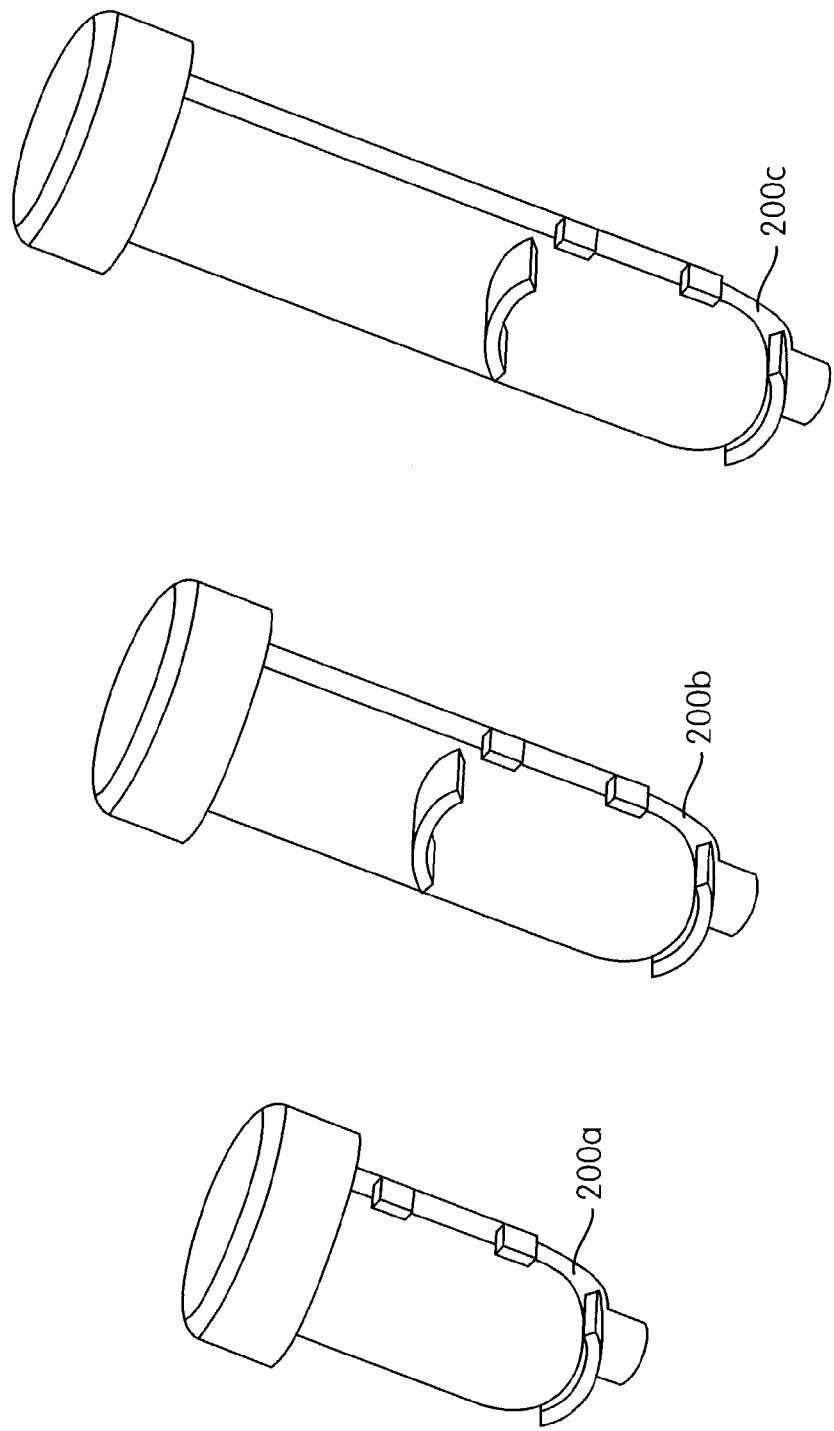
FIG. 11 shows illustrative removable sections of a golf club according to aspects of the disclosure.

It is further understood that the removable cartridge 200 may utilize features of other embodiments described herein. For example, the clip member 207 may have different lengths such as shown in FIG. 11. The cartridge holder 106 may then have corresponding structure to cooperate with a cartridge 200 with such dimensions. The cartridge 200 may also employ the various lock-out or other identifying structures described herein.

Figure 7:
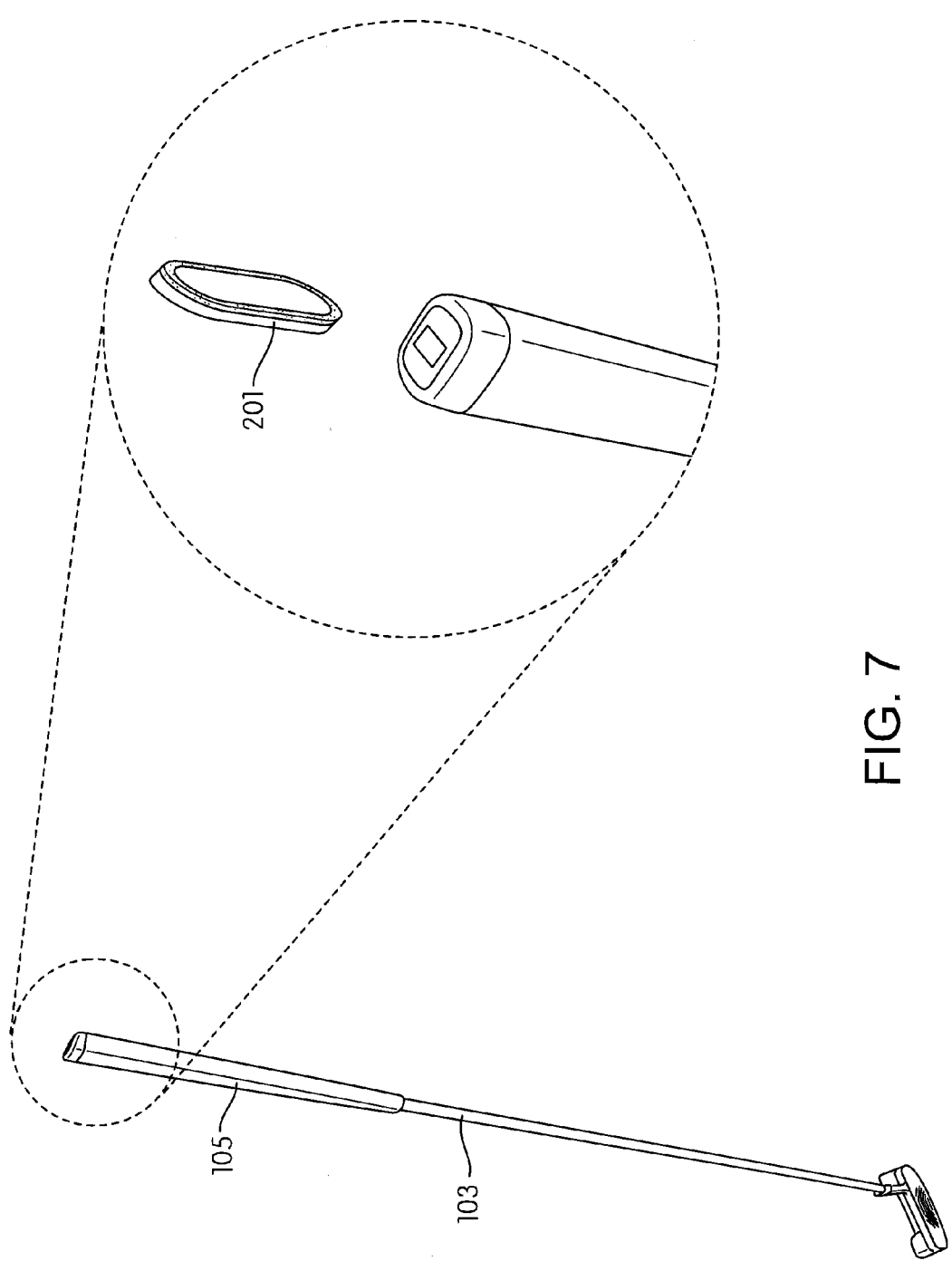
FIG. 7 is a perspective view of another embodiment of a golf club according to an illustrative embodiment of the disclosure, including an exploded view of a grip portion of the golf club having a monitoring device.

According to other aspects of the disclosure, the grip 105 may be configured to receive and secure the monitoring device 201 directly, without the inclusion of a separate removable section or cartridge 200. FIG. 7 shows an illustrative embodiment of such aspects of the disclosure.

The monitoring device 201 may be configured to be engaged with the grip 105 in a variety of ways. For example, the grip 105 may be configured with an opening at its terminal end that is configured to receive the monitoring device 201. For example, as seen in FIG. 7, the grip 105 may include a slit that is configured to receive the monitoring device 201 when the monitoring device 201 is inserted into the grip 105 along the monitoring device's longitudinal axis. The slit may be configured to provide a tight interference fit with the monitoring device 201. It is noted that in this way, the grip 105 may be configured to secure the monitoring device 201 such that the monitoring device 201 does not move within the grip 105. In this way, the removable section 200 may be configured to support and stabilize to the monitoring device 201.

Further, the grip 105 may be configured with guides within the interior of the grip 105 that guide the monitoring device 201 during insertion into the grip 105. Also, the grip may be configured with a locking mechanism, such as a cover which includes flaps through which the monitoring device is inserted. It is noted that monitoring device 201 may be configured to engage with the grip 105 via other methods as well, including snap fit mechanisms (e.g., spring loaded protrusions and corresponding detents), other mechanical fasteners, etc.

While, the engagement of the monitoring device 201 and the removable section 200 with the shaft is described above with respect to the grip 105, it is noted that, alternatively, the shaft 103 may be configured to receive the monitoring device 201 and/or the removable section 200 at the fixed end of the shaft 103, proximate the head. Further, the interior of the shaft 103 may be configured to position the monitoring device 201 at any point along the length of the shaft 103 (e.g., at the fixed end, the butt/grip end, the center, etc.).

Figure 18:
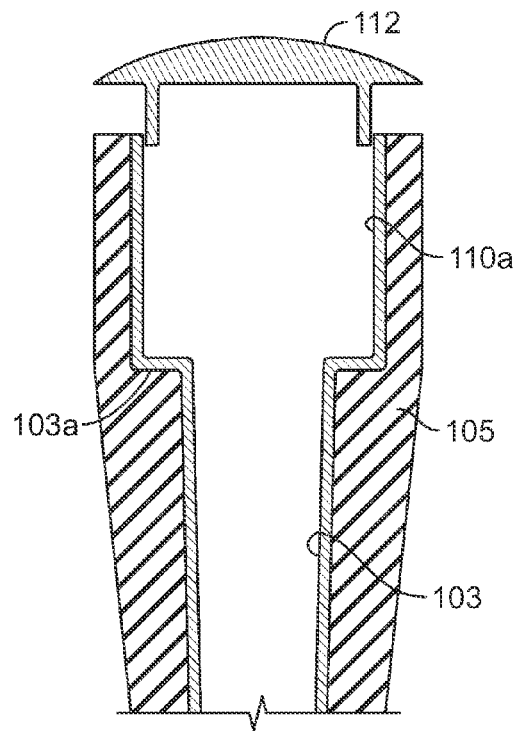
FIG. 18 illustrates another embodiment of a modified grip and shaft of a golf club according to aspects of the invention.

According to aspects of the disclosure, the grip/butt end of the shaft 103 (or a portion thereof) may be removable to allow the monitoring device 201 to be inserted, such as shown in FIG. 18 and described in greater detail below. Additionally, or alternatively, as described above, the fixed end of the shaft may be removably engaged with the golf club head 101. Hence, the monitoring device 201 may be inserted into that end of the shaft 103 as well. Further, it is noted that, if desired, more than one monitoring device 201 may be inserted into the shaft 103 in order to measure various different locations or different portions of the shaft 103 during the golf swing.

According to aspects of the disclosure, golf club 101 may include a monitoring device 201 in both the shaft 103 and in the golf club head 101. For example, the golf club 101 may include two monitoring devices 201, such as a first monitoring device 201 which is positioned in the grip 105 (such as shown in FIG. 5) and a second monitoring device 201 which is positioned in the golf club head 101 as shown and described in incorporated U.S. Provisional Application Ser. No. 61/665,834. Regardless of how many monitoring devices 201 are included in the golf club and the positioning of the monitoring devices 201 on or within the golf club, according to aspects of the disclosure, a first monitoring device 201 may be configured to be a "master" monitoring device 201 and the other monitoring devices 201 may be configured to communicate data to the "master" monitoring device 201 as also shown and described in incorporated U.S. Provisional Application Ser. No. 61/665,834.

Figure 8:
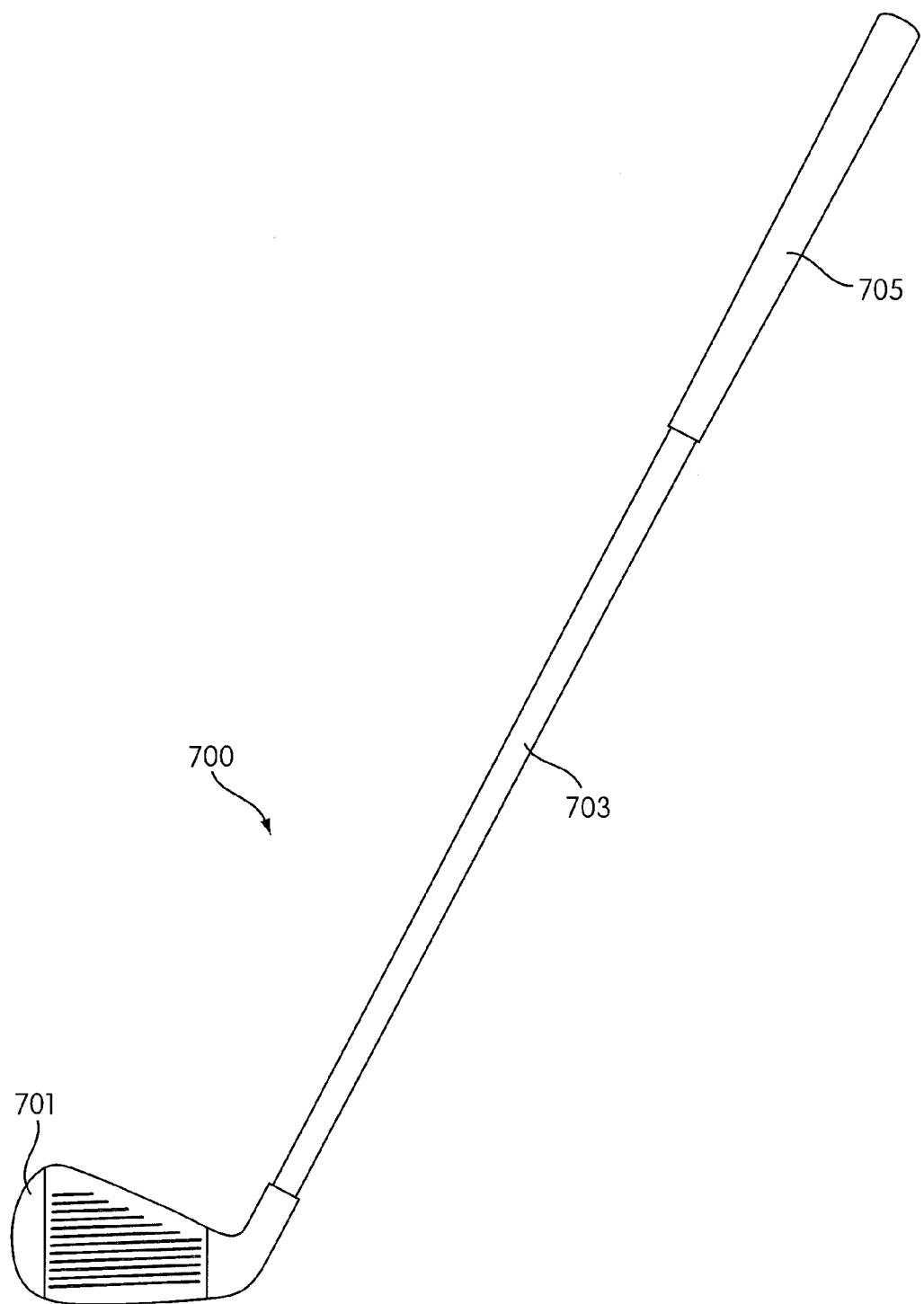
FIG. 8 is an illustrative embodiment of an iron-type golf club structure according to aspects of the disclosure.
Figure 13:
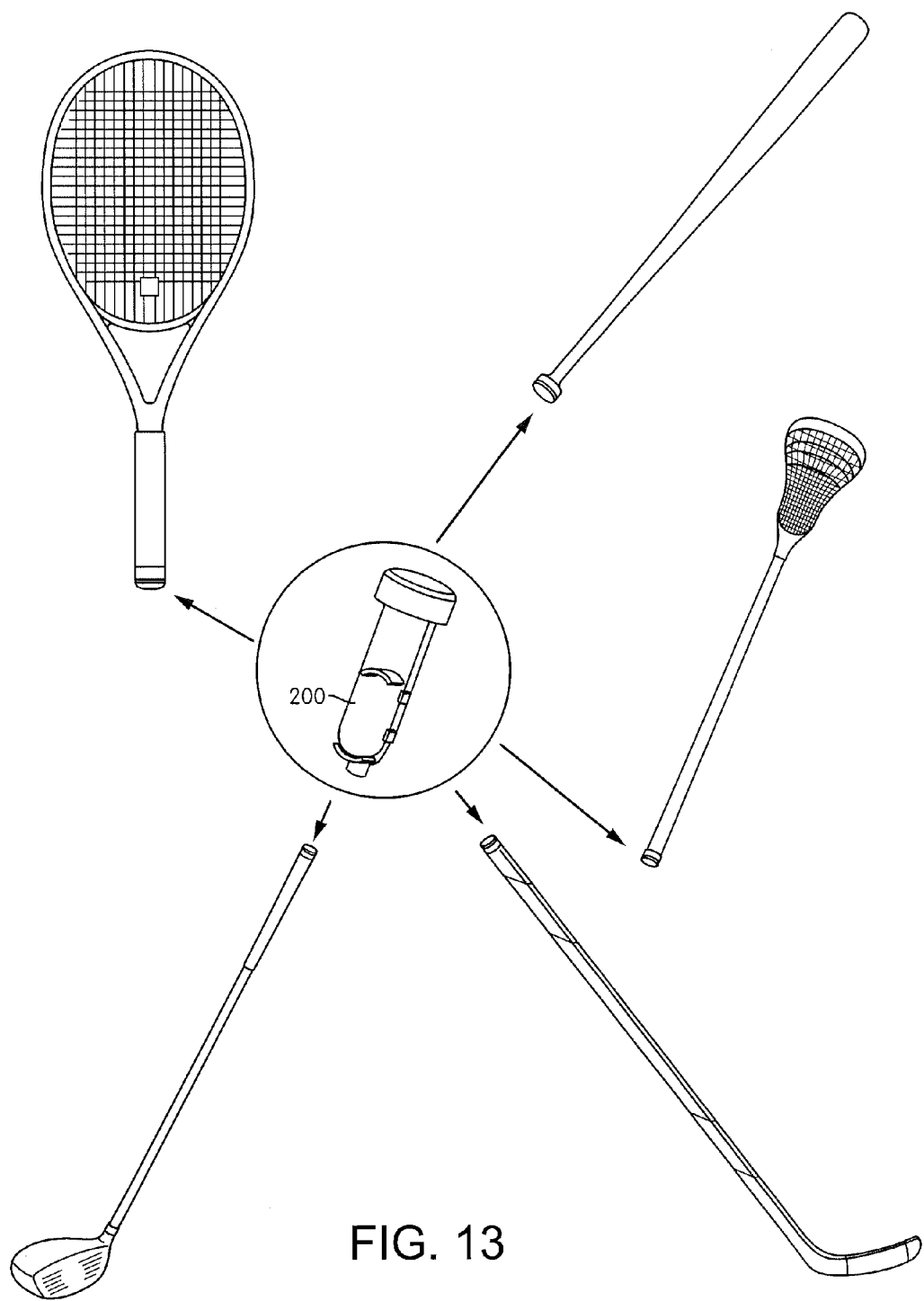
FIG. 13 is illustrates a monitoring device configured to be engaged with various different pieces of sports equipment according to aspects of the disclosure.

While wood-type golf clubs and wood-type golf club heads have been described in detail above, other aspects of this disclosure relate to iron-type golf club heads and iron-type golf clubs. For example, FIG. 8 illustrates an example of an iron-type golf club 700 according to aspects of the disclosure. As seen in FIG. 8, the iron-type golf club 700 may include an iron-type golf club head 701 in accordance with the present disclosure. It is understood that any aspects described herein may be utilized with a wood-type golf club, an iron-type golf club, or other type of golf club. Further, the monitoring device 201 and associated mounting structures may be utilized with other types of ball striking devices and sporting equipment, such as tennis or other racquets, bats (e.g., baseball, softball, cricket, etc.), hockey sticks (e.g., ice hockey, field hockey), lacrosse sticks, etc., as illustrated in FIG. 13.

In addition to the golf club head 701, the overall golf club structure 700 may include a shaft 703 and a grip or handle 705 attached to the shaft 703. The shaft 703 may be received in, engaged with, and/or attached to the golf club head 701 in any suitable or desired manner, including in conventional manners known and used in the art, without departing from the disclosure. As more specific examples, the shaft 703 may be engaged with the golf club head 701 through a shaft-receiving sleeve or element extending into the club head 701 (e.g., a hosel), and/or directly to the club head structure 701, e.g., via adhesives, cements, welding, soldering, mechanical connectors (such as threads, retaining elements, or the like). If desired, the shaft 703 may be connected to the golf club head 701 in a releasable manner using mechanical connectors to allow easy interchange of one shaft for another on the head. Also, the grip or handle 705 may be attached to, engaged with, and/or extend from the shaft 703 in any suitable or desired manner, including in conventional manners known and used in the art, e.g., using adhesives or cements, etc. The shaft 703 and the grip or handle 705 may be made from any suitable materials such as those described above with regard to the wood type golf club 100.

According to aspects of the disclosure, the golf club head 701 may also include a ball striking face (e.g., a ball striking face which includes a face plate) 711. According to aspects of the disclosure, the golf club head 701 may be constructed in any suitable or desired manner and/or from any suitable or desired materials without departing from this disclosure, including from conventional materials and/or in conventional manners known and used in the art. For example, the club head 701 and/or its various parts may be made by forging, casting, molding, and/or using other techniques and processes, including techniques and processes that are conventional and known in the art. According to aspects of the disclosure, the golf club head 701 may be a blade type iron golf club head. According to other aspects the golf club head 701 may be a perimeter weighted and/or cavity back type golf club head or other iron type golf club head structure.

By way of example, the grips of each of the golf clubs in the set of golf clubs may be configured to receive the monitoring device 201 in a manner discussed above with regard to FIGS. 5-7. For example, as discussed above, according to particular embodiments of the disclosure, monitoring device 201 may be similar to those used in the NIKE+™ athletic performance monitoring systems available from NIKE, Inc. of Beaverton, Oreg. For example, as seen in FIGS. 3A and 3B, the monitoring device 201 may include a generally rectangular compartment which may be similar to the compartment used to house sensors used in the NIKE+™ athletic performance monitoring systems available from NIKE, Inc. of Beaverton, Oreg. Further, the compartment of the monitoring device 201 may house various elements described above, such as the processor 204, sensors 202, transmitter 203, power supply 206, memory, etc. Further, as described above, according to aspects of the disclosure, the monitoring device 201 may be configured to engage with the grip 105 of the golf club. For example, as described with regard to FIG. 5, the grip 105 may be configured to receive a removable section or cartridge 200 and the removable section 200 may be configured to receive the monitoring device 201.

Figure 9:
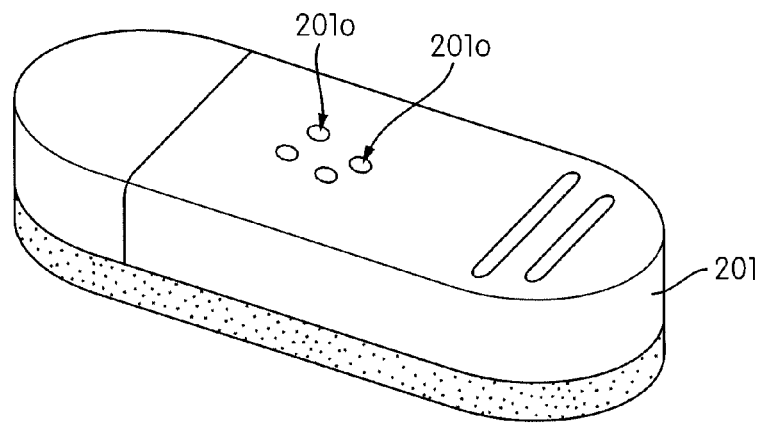
FIG. 9 is an illustrative monitoring device with openings according to aspects of the disclosure.

According to aspects of the disclosure, the engagement between the monitoring device 201 and removable section 200 the particular golf club may cause a particular IMU of the monitoring device 201 to be selectively activated. For example, as seen in FIG. 9, in one such embodiment, the monitoring device 201 may include one or more openings 201o configured to receive one or more protrusions (e.g., prongs) that extend from the removable section 200 of the particular golf club. According to aspects of the disclosure, a particular IMU of the monitoring device 201 may be activated based on which of the openings in the monitoring device 201 receive a protrusion of the removable section 200.

Figure 10A:
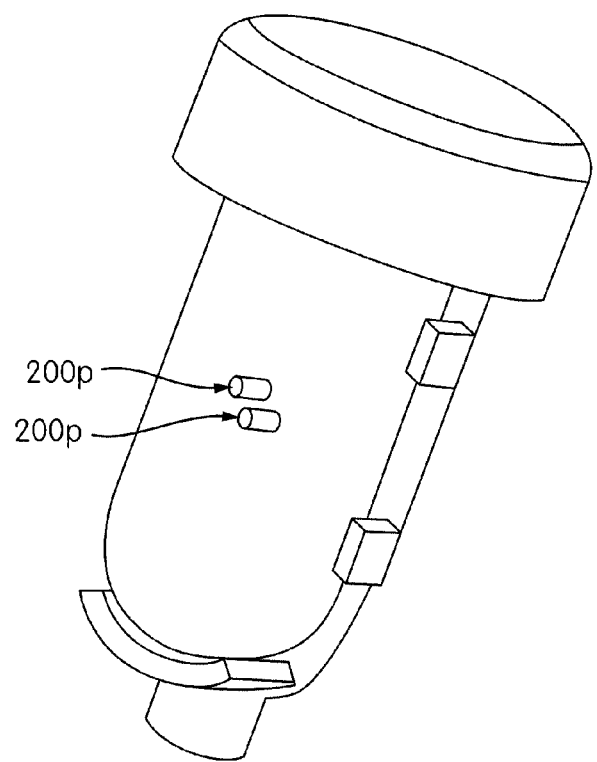
FIGS. 10A-B are illustrative removable sections of a golf club according to aspects of the disclosure.

For example, the monitoring device 201 may include four openings 201o. Further, as seen in FIG. 10A, a removable section 200 of a putter of the set of golf clubs may have two protrusions 200p that are configured to engage with the first and second of the four openings 201o of monitoring device 201. When the first and second holes are engaged by the two protrusions of the a removable section 200 of a putter, a first IMU of the monitoring device 201 that is configured to measure velocity and/or acceleration associated with a putting stroke (e.g., an IMU that may be extremely sensitive to small changes in velocity and/or acceleration (e.g., fractions of a meter per second or m/s$^2$)) may be selected and/or activated.

Figure 10B:
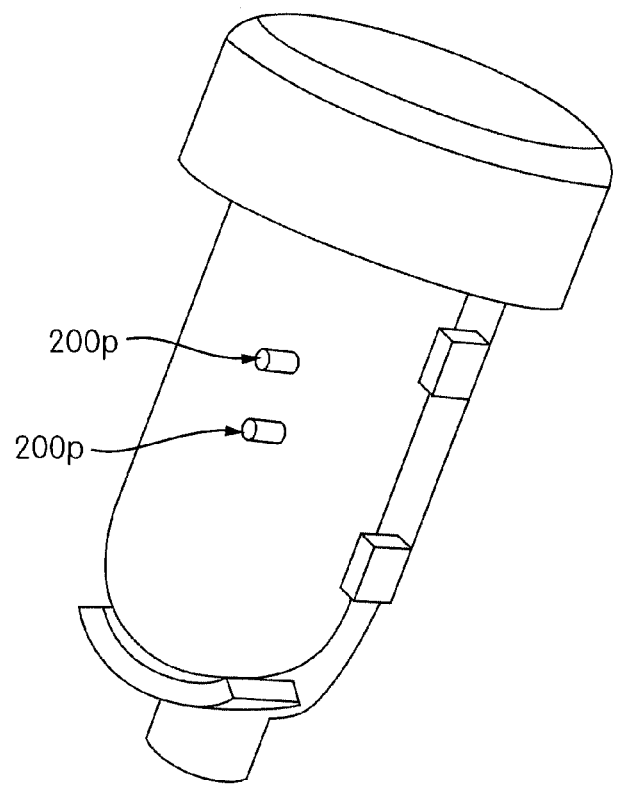

Conversely, as seen in FIG. 10B, a removable section 200 of an iron-type golf club or a wood-type golf club of the set of golf clubs may have two protrusions that are configured to engage with the third and fourth of the four openings 201o of monitoring device 201. When the third and fourth openings 201o are engaged by the two protrusions of the a removable section 200 of the iron-type golf club or the wood-type golf club, a second IMU of the monitoring device 201 that is configured to measure velocity and/or acceleration associated with a golf swing for the iron-type golf club or the wood-type golf club (e.g., an IMU that may be may be less sensitive to small changes in velocity and/or acceleration (as compared with the first IMU) and able to more accurately determine larger changes in velocity and/or acceleration (e.g., at least several meters per second or m/s$^2$)) may be activated.

It is noted that in some embodiments, the protrusions of the removable section 200 may be configured to activate detecting switches within monitoring device 201 which cause the processor 204 to determine which of the IMUs to use. Several examples of utilizing IMUs are shown and described in incorporated U.S. Provisional Application Ser. No. 61/665,834.

The protrusions 200p and openings 201o may be arranged such that the monitoring device 201 can only be engaged with the removable section in an intended orientation. For example, while a "universal" monitoring device 201 may have four holes, the protrusions 200p on the removable section 200 and openings 201o on the monitoring device 201 are arranged such that they will align only when the monitoring device 201 is engaged with the removable section 200 in the intended orientation.

It is noted that according to other aspects of the disclosure, and as shown in FIG. 7, the grip 105 may be configured to receive and secure the monitoring device 201 directly, without the inclusion of a separate removable section. As discussed above, the monitoring device 201 may be configured to be engaged with the grip 105 in a variety of ways. For example, the grip 105 may be configured with an opening at its terminal end that is configured to receive the monitoring device 201. However, regardless of how the monitoring device 201 is engaged with the grip 105, the grip 105 itself may be configured with the above discussed protrusions 200p configured to engage with the openings 201o in the monitoring device 201 to selectively determine which of the IMUs of the monitoring device 201 to use in capturing data associated with the golf stroke. For example, the grip 105 may include a slit that is configured to receive the monitoring device 201 when the monitoring device 201 is inserted into the grip along the monitoring device's longitudinal axis. Further, one or both of the rounded ends of the compartment of the monitoring device 201 may be configured to include the openings 201o which are configured to receive the protrusions 200p and the lower end of the slit may include the one or more protrusions 200p. Additionally, or alternatively, the protrusions 200p may positioned on the sides of the slit and may be spring loaded, flexible, etc. in order to accommodate the insertion and removable of the monitoring device 201.

It is noted that while four openings 201o and four protrusion 200p are discussed in the illustrative embodiment, it is clear that any combination of openings 201o and protrusions 200p may be used provided the combination will sufficiently allow the monitoring device 201 to selectively determine which of the IMUs of the monitoring device 201 to use in capturing data associated with the golf stroke.

In addition to the above described embodiment which includes protrusions for activating detection switches, shape memory alloy may be used as well. Shape memory alloy is a substance which is configured to return to its original shape upon heating.

Further, while the above embodiment discussed the structural engagement between the monitoring device 201 and the golf club 100 as a means of allowing the monitoring device 201 to selectively determine which of the IMUs of the monitoring device 201 to use in capturing data associated with the golf stroke, other methods and means may be used as well, including an RFID chip or other chip, as discussed elsewhere herein.

According to aspects of the disclosure, the monitoring device 201 may be configured to be charged. As described above, the monitoring device 201 may include a power supply (e.g., a battery). Further, the monitoring device 201 may be configured to receive a charging cable which will provide power to recharge the power supply. In some embodiments, the monitoring device 201 may be configured to receive the charging cable while the monitoring device 201 is in the golf club itself. For example, in embodiments where the monitoring device 201 is positioned in the shaft/grip of the golf club, the end of the golf club may be removed and the charging cable may be hooked into the monitoring device 201. In another embodiment, the cartridge 200 as shown in FIGS. 6 and/or 27-32 may include integral structure to enable charging. Alternatively, according to aspects of the disclosure, the monitoring device 201 may be configured to be charged via induction charging.

According to aspects of the disclosure, the monitoring device 201 is configured to receive information via a charging cable. For example, the charging cable may be a USB cable which is configured to connect the monitoring device 201 with computer (e.g., the remote computer 400) or other data source. Accordingly, during the connected with the computer, the monitoring device 201 can update firmware, reboot the system, and conduct other diagnostic checks and updates as needed or instructed.

As seen in FIGS. 10A and B, the removable section 200 may include a circular portion which forms the top of the shaft and, also, an elongated portion configured to house the monitoring device 201. According to aspects of the disclosure, the elongated portion of the removable section 200 may include guides to aid in positioning and securing the monitoring device 201 within the removable section 200. It is noted that the removable section 200 may be configured to secure the monitoring device 201 in such a way that the monitoring device 201 does not move within the removable section 200. For example, the removable section 200 may be configured to engage with the monitoring device 201 (e.g., a compartment which includes the exterior of the monitoring device 201) via press fitting, snap fit mechanisms (e.g., spring loaded protrusions and corresponding detents), mechanical fasteners, etc. For example, the elongated portion may include a first arched end configured to engage a first rounded end of the compartment, a second arched end configured to engage a second rounded end of the compartment and a back portion which extends between the first arched portion and the second arched portion and is configured to engage a side of the compartment. In this way, the removable section 200 may be configured to support and stabilize the monitoring device 201. For example, the elongated portion may be configured to secure the compartment which may be rectangular with first and second rounded ends and have a length in the range of 1.0-1.5 inches, a width of 0.4-1.0 inches and thickness of 0.2-0.45 inches.

According to aspects of the disclosure, the elongated portion of the removable section 200 may be configured to have a particular length such that when the removable section 200 is engaged with the grip of the golf club, the removable section 200 positions the monitoring device 201 within the shaft 103 such that the monitoring device 201 is offset by a specified distance from a reference point. For example, according to one embodiment, the elongated portion of the removable section 200 may include the first arched end configured to engage a first rounded end of the compartment, the second arched end configured to engage a second rounded end of the compartment and the back portion which extends between the first arched portion and the second arched portion and is configured to engage a side of the compartment, but the first arched end, second arched end and back portion are spaced further away from the round portion of the removable section which forms the end cap. For example, the first arched end, second arched end and back portion may be spaced from the round portion by a section of the elongated portion that extends between the round portion and the upper arched end of the guide for receiving the monitoring device.

The section of the elongated portion that extends between the round portion and the upper arched end of the guide may be a particular length such that when the removable section 200 is engaged with the shaft, of the golf club, the removable section 200 positions the monitoring device 201 within the shaft such that the monitoring device 201 is offset by a specified distance from a reference point. Further, as each different golf club in the set of golf club has a center of mass that is in a different location than the other golf clubs in the set, the removable section 200 associated with each of the respective, different golf clubs in the set may have to be configured differently in order to ensure the that the respective monitoring device 201 is positioned within the shaft, such that the monitoring device 201 is offset by a specified distance from a reference point. For example, the length of the section of the elongated portion that extends between the round portion and the upper arched end of the guide may be a different for each of the respective removable sections 200 in the golf club set in order to ensure the that the respective monitoring device 201 is positioned within the shaft, such that the monitoring device 201 is offset by a specified distance from a reference point.

Figure 12:
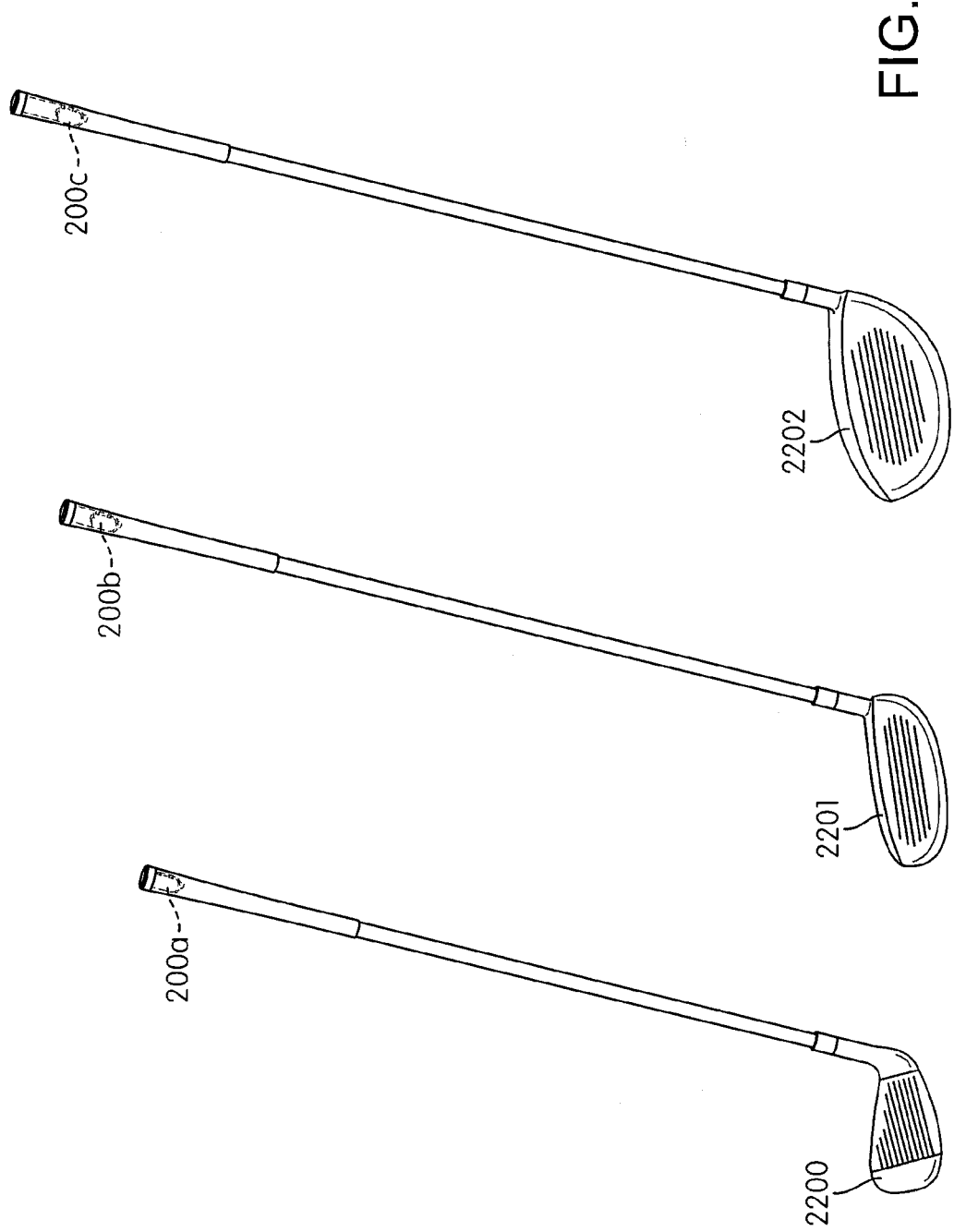
FIG. 12 shows the illustrative removable sections of FIG. 11 in combination with their respective golf clubs according to aspects of the disclosure.

FIG. 11 illustrates embodiments of such removable sections 201. As seen in FIGS. 11-12, according to a particular embodiment of the disclosure, a first removable section 200 associated with a first golf club of the set of golf clubs may have a first elongated portion that has a first length, while a second removable section 200 associated with a second, different golf club of the set of golf clubs may have a second elongated portion that has a second length which is different (e.g., longer) from the first length. Further, as seen in FIG. 11, according to a particular embodiment of the disclosure, a third removable section 200 associated with a third, different golf club of the set of golf clubs may have a third elongated portion that has a third length, which is different (e.g., longer) than the first or second lengths. For example, a shorter club (e.g., a pitching wedge) may have the removable section 200 with the elongated portion that has the first length while a longer club (e.g., a long iron or hybrid type golf club) may have the removable section 200 with the elongated portion that has the second length. Further, an even longer club (e.g., a driver) may have the removable section 200 with the elongated portion that has the third length. It is noted that while only three embodiments are shown in FIG. 11, each of the golf clubs in the set could have a removable section 200 with an elongated portion of a different length (e.g., increasing longer as the length of the club increases) in order to position the monitoring device 201 in the correct positioning.

According to other embodiments of the disclosure, the removable sections 200 may have other structures as well. For example, according to some embodiments of the disclosure, the removable sections 200 may be a self-locating, conical structure in which the monitoring device 201 is received. The conical structure may be configured to engage with the interior of the shaft 103 of the golf club 100 in order to position the monitoring device 201 in the appropriate position within the shaft 103. For example, the multitude of conical removable sections 200 for engagement with the different clubs in a set of golf clubs may be longer and wider (e.g., have an increased diameter) to position the monitoring device 201 in the appropriate position within the shaft 103. According to some embodiments of the disclosure, the interior of the golf club shaft 103 may include a structured (e.g., positioning recesses/protrusions or ledges) which are configured to engage with the removable sections 200 and position the monitoring device 201 in the appropriate position within the shaft 103.

While the concept of a set of golf clubs in which each club may be configured such that it secures its respective monitoring device 201 at a common point respective to each of the golf clubs in the set (e.g., such that the monitoring device 201 is offset by an identical specified distance from a reference point which is common to each of the golf clubs in the set) has been illustrated with respect to a removable section 200, it is noted that other means may be used as well, such as those described in incorporated U.S. Provisional Application No. 61/665,834.

Figure 14A:
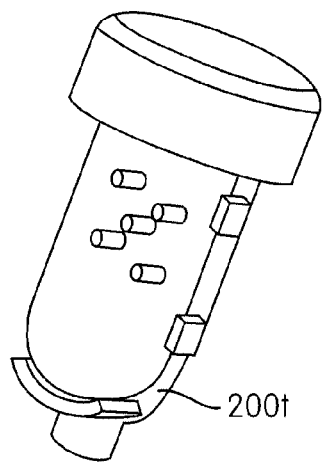
FIGS. 14A-C show illustrative removable sections of pieces of sports equipment according to aspects of the disclosure.
Figure 14B:
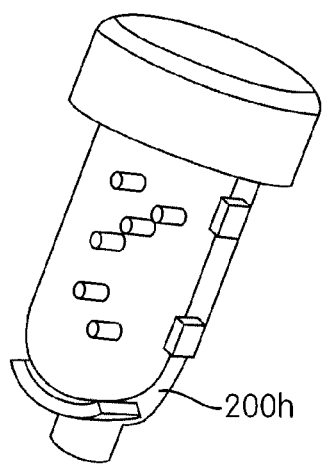
Figure 14C:
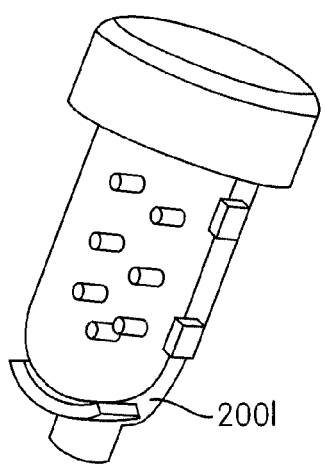

FIGS. 14A-C show illustrative removable sections 200 according to aspects of this disclosure. As seen in FIGS. 14A-C, each of the removable sections 200 may include an elongated portion configured to aid in housing the monitoring device 201. As described above, each of the elongated portions may include a first arched end configured to engage a first rounded end of the compartment, a second arched end configured to engage a second rounded end of the compartment and a back portion which extends between the first arched portion and the second arched portion and is configured to engage a side of the compartment of the monitoring device 201. According to aspects of the disclosure, the elongated portion of each of the removable section 200 may include the one or more protrusions 200$p$. As seen FIG. 14A, the illustrative removable section 200T includes a plurality of protrusions 201$p$ which are arranged in unique positioning. In this case there are five protrusions 200$p$ arranged in the unique positioning. It is noted that the number of protrusions 200$p$ and the unique positioning of those protrusions 200$p$ may be configured such that when engaged with the monitoring device 201, they indicate to the monitoring device to the piece of sports equipment with which the monitoring device 201 is engaged. For example, the number of protrusions 200$p$ and the unique positioning of those protrusions 200$p$ in illustrative removable section 200T may indicate to the monitoring device 201 that the monitoring device 201 is engaged with a tennis racquet.

Similarly, FIGS. 14B-C each show other illustrative removable sections 200 with their own respective plurality of protrusions 201$p$ which are arranged in unique arrangements. For example, as seen in FIG. 14B, the illustrative removable section 200H may include six protrusions 200$p$ arranged in a unique positioning which may indicate to the monitoring device 201 that the monitoring device 201 is engaged with a hockey stick. Further, as seen in FIG. 14C, the illustrative removable section 200L may include seven protrusions 200$p$ arranged in a unique positioning which may indicate to the monitoring device 201 that the monitoring device 201 is engaged with a lacrosse stick.

Figure 15:
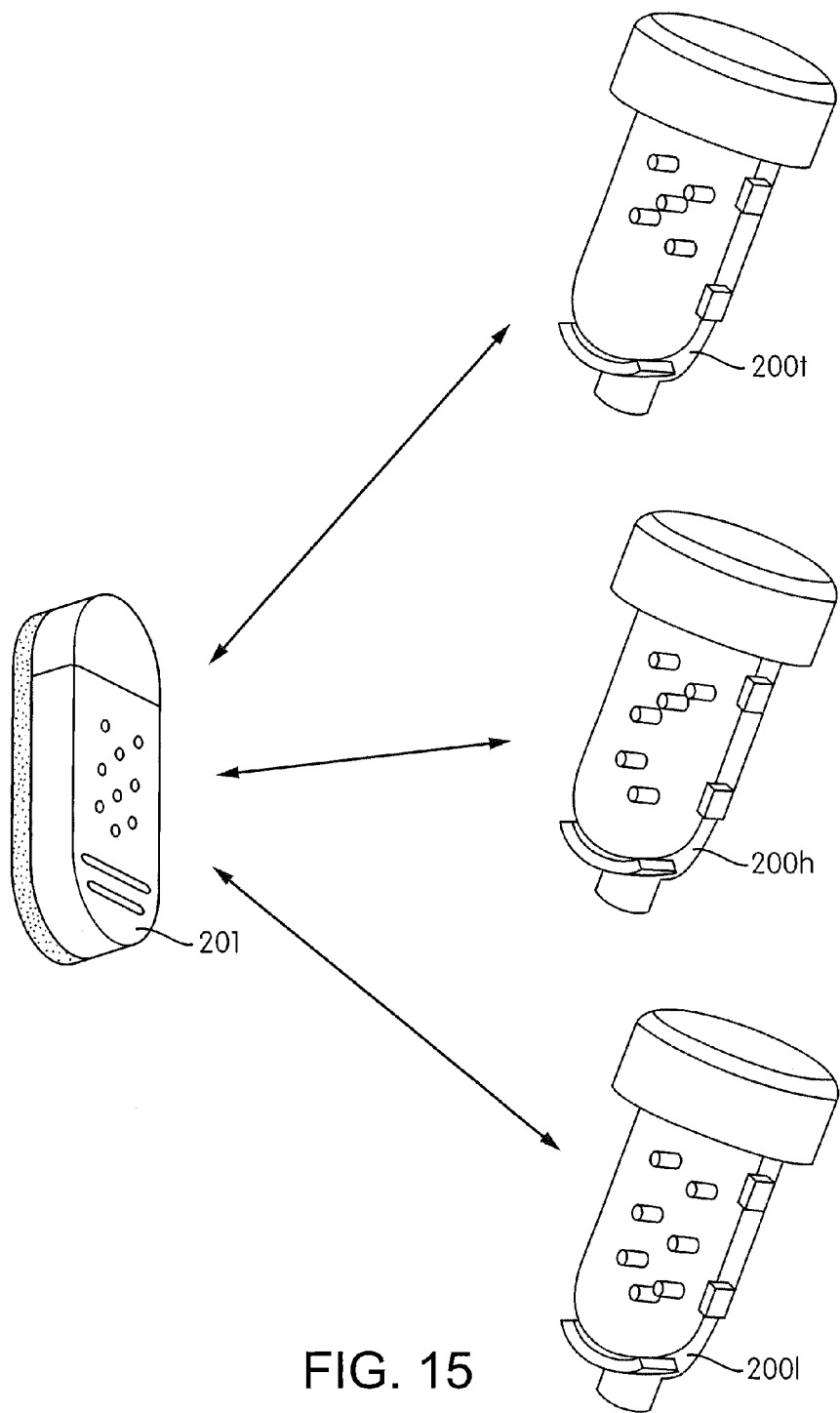
FIG. 15 is an illustrative monitoring device with openings according to aspects of the disclosure configured to be engaged with the removable sections of FIGS. 14A-C.

FIG. 15 shows an illustrative monitoring device 201 according to aspects of this disclosure. As seen in FIG. 15, the flat side of the compartment of the monitoring device 201 may be configured to include the one or more openings 201$o$ (which are configured to receive the protrusions 200$p$. Additionally, or alternatively, one or both of the rounded ends of the compartment of the monitoring device 201 may be configured to include the openings 201$o$ which are configured to receive the protrusions 200$p$ which are positioned on the first arched portion and/or the second arched portion of the removable section 200.

As seen FIG. 15, the illustrative monitoring device 201 includes a plurality of openings 201$o$ which are arranged such that the openings 201$o$ can accommodate each of the unique arrangements of the protrusions of the various removable sections 200. In this example, there are nine opening 201o which are configured to receive the protrusions of the various removable sections 200. Further, as seen in FIG. 15, the openings 201o can receive each of the unique arrangements of the protrusions of the various removable sections 200T, 200H, 200L.

It is noted that these embodiments are merely illustrative and not meant to be limiting. For example, while nine openings and 5-7 protrusions are discussed in the illustrative embodiments, it is clear that any combination of openings and protrusions may be used provided the combination will sufficiently allow the monitoring device 201 to selectively determine the piece of sports equipment with which the monitoring device 201 has been engaged and, further, select the particular characteristics it will measure and the data it will collect. For example, other protrusions 200p (e.g., number of protrusions, arrangements of protrusions) and sets of openings 201o (e.g., number of openings, arrangements of openings) may be used in accordance with aspects of the disclosure.

It is noted that in some embodiments, the protrusions of the removable sections 200 may be configured to activate detecting switches within monitoring device 201 which cause the processor 204 to determine the piece of sports equipment with which the monitoring device 201 has been engaged and, further, is configured to select the particular characteristics it will measure and the data it will collect. For example, engagement of the protrusions with the openings of the removable section 200 may cause the detecting switches within the openings to move from a first position to second position. The processor 204 may be configured to recognize this movement and depending on which of the detecting switches have been moved, determine the piece of sports equipment with which the monitoring device 201 has been engaged and, further, is select the particular characteristics it will measure and the data it will collect. Alternatively, there may be electrical connections made between the protrusions and the elements (e.g., leads) within the opening of the removable section 200. The processor 204 may be configured to recognize these connections and depending on which of the elements are contacted and, thereby, determine the piece of sports equipment with which the monitoring device 201 has been engaged and, further, select the particular characteristics it will measure and the data it will collect. Of course, these are just examples and other methods of selectively determining the piece of sports equipment with which the monitoring device 201 has been engaged and, further, selecting the particular characteristics it will measure and the data it will collect may be used.

The protrusions and openings may be arranged such that the monitoring device 201 can only be engaged with the removable section in an intended orientation. For example, while the "universal" monitoring device 201 may have nine holes, the protrusions on the removable section 200 and holes on the monitoring device 201 are arranged such that they will align only when the monitoring device 201 is engaged with the removable section 200 in the intended orientation.

It is noted that as discussed above, according to other aspects of the disclosure, the grip 105 may be configured to receive and secure the monitoring device 201 directly, without the inclusion of a separate removable section or cartridge 200. As discussed above, the monitoring device 201 may be configured to be engaged with the grip 105 in a variety of ways. For example, the grip 105 may be configured with an opening at its terminal end that is configured to receive the monitoring device 201. However, regardless of how the monitoring device 201 is engaged with the grip 105, the grip 105 itself may be configured with the above discussed protrusions configured to engage with the openings in the monitoring device 201 to selectively determine the piece of sports equipment with which the monitoring device 201 has been engaged and, further, select the particular characteristics it will measure and the data it will collect accordingly. For example, the grip 105 may include a slit that is configured to receive the monitoring device 201 when the monitoring device 201 is inserted into the grip along the monitoring device's longitudinal axis. Further, one or both of the rounded ends of the compartment of the monitoring device 201 may be configured to include the openings which are configured to receive the protrusions and the lower end of the slit may include the one or more protrusions. Additionally, or alternatively, the protrusions may positioned on the sides of the slit and may be spring loaded, flexible, etc. in order to accommodate the insertion and removable of the monitoring device 201.

According to an additional aspect, a club as described herein may be dimensioned to accommodate a larger component, such as a larger monitoring device 201 or a monitoring device 201 having a larger sized power supply 206 (e.g. battery). In one embodiment, the power supply 206 and/or the device 201 may be positioned in a receptacle 110a proximate the end of the grip 105, such as by using a removable section 200 as described above and shown in FIGS. 5 and 9-15, a configuration as shown in FIG. 7, or another configuration. The shaft 103 and/or the grip 105 may be dimensioned, in such configurations, to have a larger internal dimension (ID) to accommodate the larger power supply 206. The shaft 103 and/or the grip 105 may also include a larger outer/external dimension (OD) as a result of the increased ID, although in one embodiment, the ID may be increased with either no increase or a proportionately smaller increase in the OD, such as by thinning the wall of the shaft 103. It is understood that the ID and the OD referred to herein are dimensions of a cross-section taken perpendicular to the central axis of the shaft 103. A typical golf club shaft has a maximum internal dimension of 0.5-0.7 inches (typically an internal diameter). In one embodiment, the shafts 103 as shown in FIGS. 16-21 may have a receptacle 110a with a maximum internal dimension of 0.510-1.0 inches. This increased maximum internal dimension permits a component, such as a battery 206 or a monitoring device 201 with an internal battery 206, having an external width of between 0.505 and 1.00 inches to be received therein. Other component sizes may be accommodated by using shafts 103 with different dimensions, according to the principles described herein. Additionally, it is understood that while these accommodation principles are described with respect to a golf club, they are not limited for use with golf clubs and may be used with any of various other striking devices. It is understood that the internal dimension of the shaft 103 may generally taper outwardly toward the butt end, and in one embodiment, the shaft 103 may have its maximum internal and external dimensions at the point adjacent the receptacle 110a.

Figure 16:
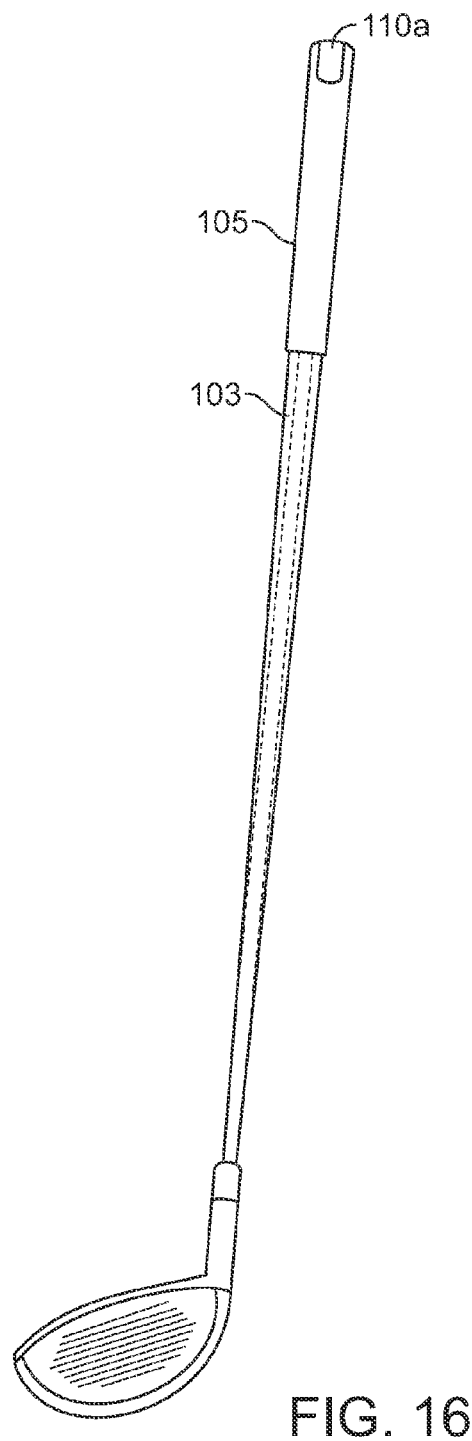
FIG. 16 illustrates one embodiment of a golf club including a modified shaft and grip according to aspects of the invention.
Figure 17:
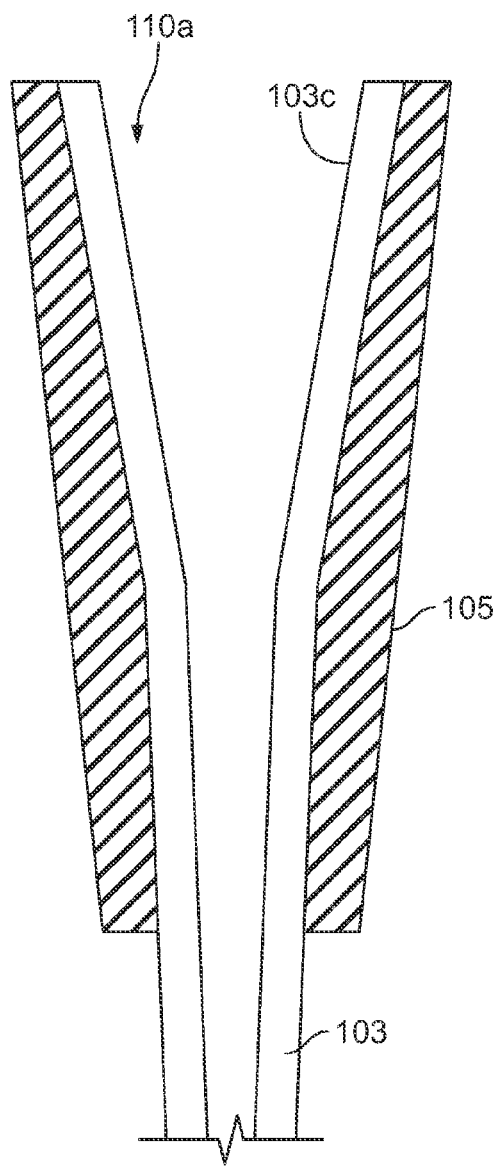
FIG. 17 illustrates another embodiment of a modified grip and shaft of a golf club according to aspects of the invention.

In one embodiment, as shown in FIG. 16, a receptacle 110a for the enlarged component may be located at the butt end of the shaft 103 (also referred to as the distal end), and the shaft 103 may be tapered differently along its entire length in order to create a larger ID and OD proximate the butt end of the shaft 103. A typical shaft dimension is illustrated in broken lines in FIG. 16. In another embodiment, a portion of the shaft 103 may an ID and/or OD that increase more rapidly than other portions of the shaft 103. For example, as shown in FIG. 17, a portion 103c of the shaft 103 may have a different taper angle from the remainder of the shaft 103 in order to create a larger ID and OD at the receptacle 110a proximate the butt end of the shaft 103. In another example, as shown in FIG. 18, the shaft 103 may have a step or shoulder 103*a* (i.e. a rapid increase in diameter formed by a rapid increase and then a rapid decrease in taper angle) located at some point along the length of the shaft 103 to create a larger ID and OD at the receptacle 110*a* proximate the butt end of the shaft 103. In this embodiment, the portions of the shaft 103 other than the step 103*a* may have substantially the same taper angle or different taper angles. FIG. 18 also includes a cap 112, which may constitute one example of an access member to permit access to the receptacle 110*a*. The cap 112 in this embodiment is configured for a snap fit connection, but other configurations may be used as well, including threading, press-fit, flip-top, and other suitable configurations. Other embodiments herein may incorporate similar access members. A removable section 200 may alternately be used in connection with any of the embodiments of FIGS. 16-21.

The grip 105 may be enlarged and otherwise dimensioned to be engaged with the larger end of the shaft 103 in any of these embodiments. The ID of the grip 105 may be enlarged substantially similarly to the OD of the shaft 103, in order to facilitate engagement. In one embodiment, the OD of the grip 105 may have a lesser degree of enlargement than the ID of the grip 105 and/or the OD of the shaft 103. For example, as shown in FIG. 18, the portions of the grip 105 located beyond the step 103*a* may have walls that are thinner than some portions of the grip 105 located closer to the club head. The grip 105 may have a substantially constant wall thickness in another embodiment.

It is understood that while the shafts 103 shown in FIGS. 16-21 are circular in cross-section, shafts 103 having other shapes may be used as well, such as an elliptical or obround shape. In one embodiment, the relevant ID and OD are the maximum internal dimension and the maximum outer dimension of the shaft. Additionally, the increase in ID or OD may not be constant or proportional around the entire periphery of the shaft 103. In other words, the ID and/or OD may increase only along one axis, or to a greater degree along one axis, relative to other axes. For example, a shaft 103 with a circular cross-section may be disproportionately enlarged to create an elliptical, obround, or other elongated shape.

Figure 19:
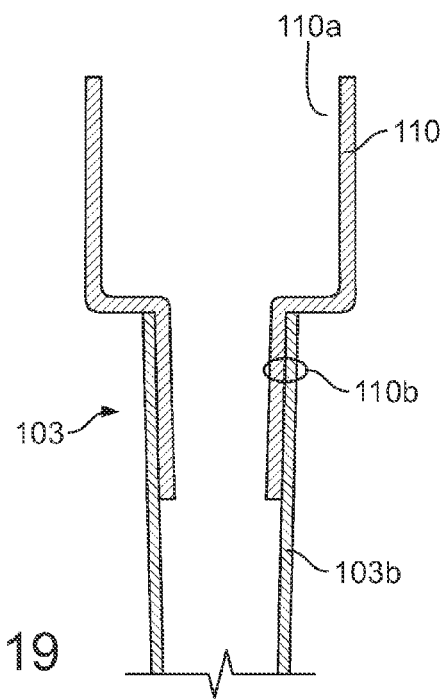
FIG. 19 illustrates another embodiment of a modified shaft of a golf club according to aspects of the invention.
Figure 20:
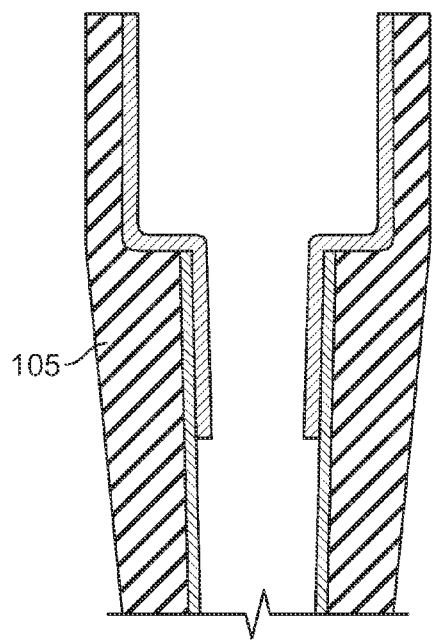
FIGS. 20 and 21 illustrate the shaft of FIG. 19 with different grips connected to the shaft.
Figure 21:
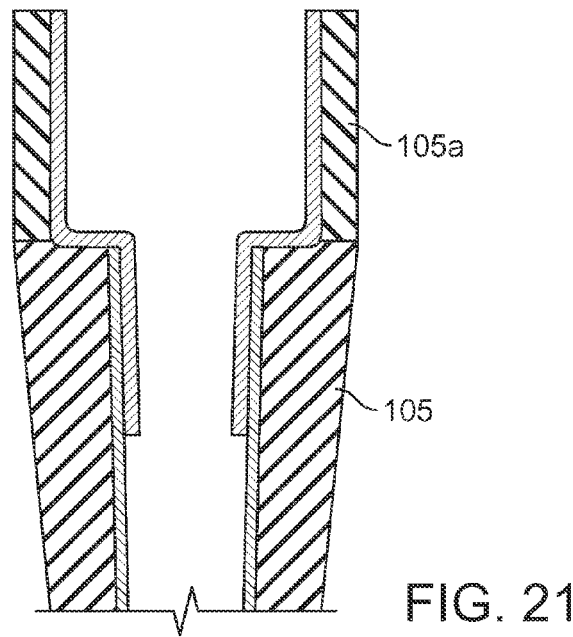

The enlarged ID and/or OD of the shaft 103 may be created by an extension 110 connected to the end of a conventional shaft body 103*b*, such as in the embodiment in FIGS. 19-21. In this embodiment, the extension 110 defines a housing that includes a receptacle 110*a*, which is configured to receive components such as the monitoring device 201, the power source 206, and/or other components, and a connector 110*b* configured for connection to the shaft body 103*b*. The connector 110*b* may be configured for connection to the shaft body 103*b* by a variety of different connecting structures, such as press-fit, bonding (e.g. adhesive, cement, etc.), threading connection, snap fit or other interlocking connections, and/or other permanent or releasable connections. The shaft body 103*b* may have complementary connecting structure in one embodiment. As shown in FIGS. 18-19, the connector 110*b* has an ID and OD that are smaller than the ID and OD of the portion of the extension defining the receptacle 110*a*, and the step 103*b* creates this difference in dimension. The connector 110*b* in this embodiment also has an ID and OD that are smaller than the ID and OD of the shaft 103. The extension 110 may be configured to receive a cap 112 as described above, a removable section 200 as described above and shown in FIGS. 5 and 9-15, and/or a different type of access member that may be manipulated to provide access to the internal components. Alternately, the extension 110 may be configured to receive one or more components similarly to the embodiment shown in FIG. 7, or another configuration as described above. Additionally, in the embodiments of FIGS. 17-21, it is understood that the shaft 103 may have its maximum ID and OD at the juncture between the shaft 103 and the extension 110.

A grip 105 such as shown in FIG. 18 may be used for connection to the shaft 103 with such an extension 110, as illustrated in FIG. 20, where a single, integral grip member 105 covers the end portion of the shaft 103 and also at least partially covers the outside of the extension 110. In another embodiment, the extension 110 may have a separate outer grip member 105*a* that is substantially flush with the outer surface of a traditional grip member 105 engaged with the shaft body 103*b*, as illustrated in FIG. 21. Other types of grips 105 may be utilized in further embodiments.

Figure 22:
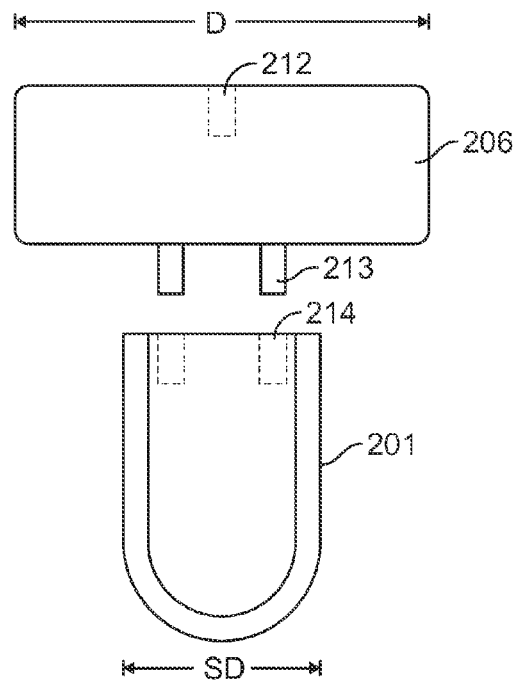
FIGS. 22-25 illustrate embodiments of monitoring devices and power sources for the monitoring devices, according to aspects of the invention.
Figure 23:
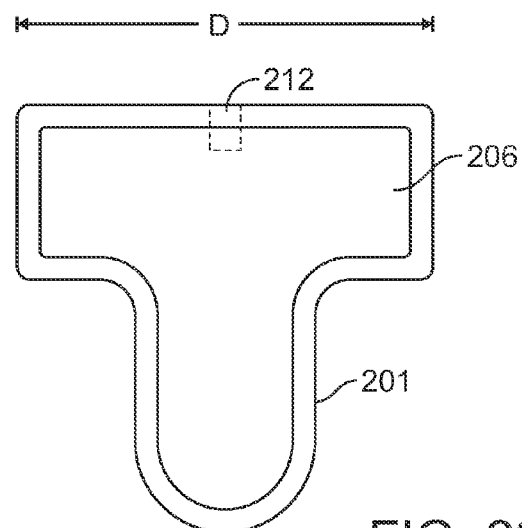
Figure 24:
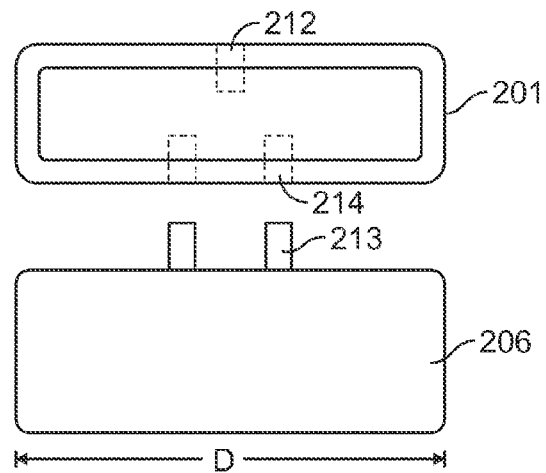
Figure 25:
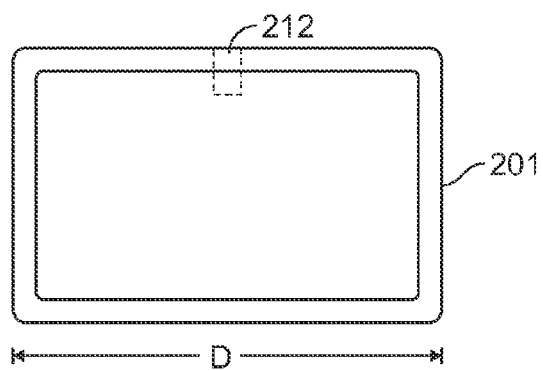
Figure 26:
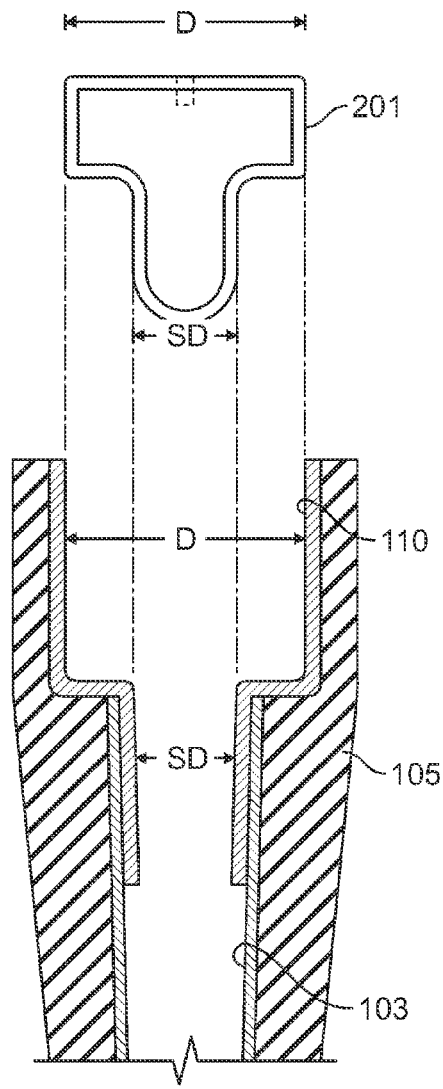
FIG. 26 illustrates an exploded view of a grip portion of the golf club having a monitoring device and power source for the monitoring device, according to aspects of the invention.

Various different configurations of monitoring devices 201 and power sources 206 may be accommodated by golf clubs as shown in FIGS. 16-21 and described above. FIGS. 22-25 illustrate various examples of such monitoring devices 201 that can be used in conjunction with the embodiments of FIGS. 16-21. FIG. 22 illustrates a monitoring device 201 with a separate power source (e.g. battery) 206 that is connectable to the monitoring device 201 by one or more contacts 213 that are received in one or more receptacles 214 in the monitoring device. In this embodiment, the battery 206 is larger (wider) than the device 201 and is accommodated by the increased dimension D of the shaft 103, as described above. The device 201 may be sized to fit in a standard diameter SD shaft in one embodiment, as shown in FIG. 26. FIG. 23 illustrates a monitoring device 201 with an integrated battery 206 that is enlarged with respect to the rest of the device 201 and can be accommodated by the increased dimension D of the shaft 103, as described above. FIG. 24 illustrates a monitoring device 201 with a separate battery 206 that is connectable to the monitoring device 201 by one or more contacts 213 that are received in one or more receptacles 214 in the monitoring device 201. In this embodiment, both the battery 206 and the device 201 are sized to be accommodated by the increased dimension D of the shaft 103, as described above. FIG. 25 illustrates a monitoring device 201 with an integrated battery 206, where the entire device 201 is enlarged and can be accommodated by the increased dimension D of the shaft 103, as described above. The batteries 206 and/or the devices 201 in these embodiments may also have recharge ports 212 that may be accessible through the end of the shaft 103 by manipulating the access member (e.g. cap 112). The increased dimension D of the shaft 103 may also function to accommodate monitoring devices 201 and/or batteries 206 of further different sizes and shapes, as well as other components with such sizes.

Figure 34:
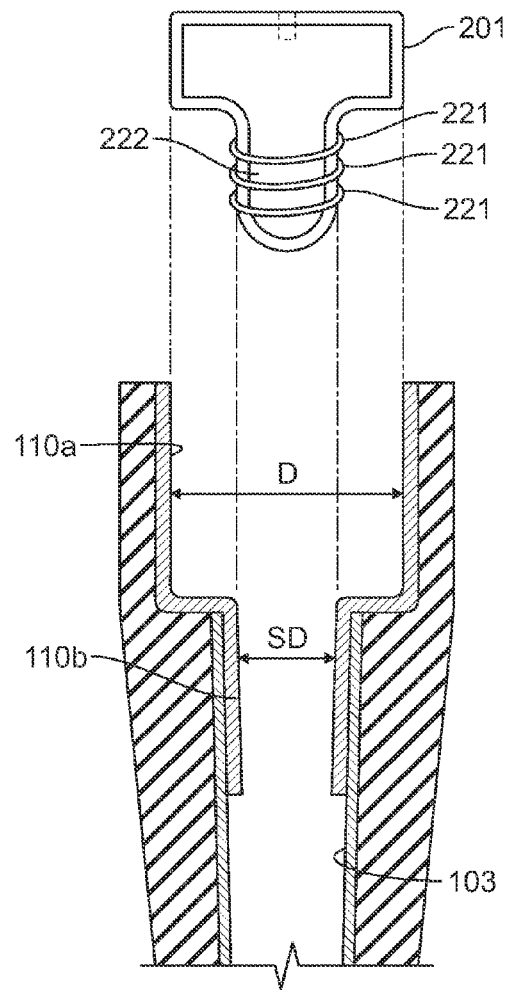
FIG. 34 is an exploded view of the grip portion and monitoring device of FIG. 34, having flexible members disposed thereon.

The monitoring device 201 may be retained inside the receptacle 110*a* in various manners, including, without limitation, interference fit, threading, fasteners, and other structures and techniques described elsewhere herein. In one example embodiment, as shown in FIG. 34, the monitoring device 201 may have flexible members 221 positioned on a portion thereof. The flexible members 221 in this embodiment are flexible ridges that extend completely around a depending portion 222 of the casing of the monitoring device 201 to retain the monitoring device 201 in place inside the receptacle 110*a*. In other embodiments, the flexible members 221 may have a different configuration, and may have any configuration described above with respect to FIG. 33. The flexible members 221 are configured to engage the standard diameter SD of the shaft 103 and/or the interior surfaces of the connector 100*b* in this embodiment. In one embodiment, the flexible members 221 may be positioned at least on the areas of the depending portion 222 that have the maximum dimension perpendicular to the direction of insertion into the grip 105/shaft 103. In other example embodiments, the device 201 may have flexible members 221 configured to additionally or alternately engage increased dimension D of the shaft 103. The flexible members 221 allow the monitoring device 201 to be inserted into multiple shafts having varying shaft diameters. This further allows the monitoring device 201 to be used in different clubs or other sporting equipment. It is understood that other embodiments of electronic modules 201 shown and described herein may include flexible members 221 for these purposes, including the electronic modules 201 illustrated in FIGS. 3A-4C, 7, 9, and 22-25. The flexible members 221 can be formed from a variety of materials known in the art, including rubber or polyurethane, as described above. In another embodiment, one or more fasteners (not shown) may be used to retain the monitoring device 201 within the receptacle 110a, including the configuration described above and shown in FIG. 6 or other configurations.

The ability to accommodate larger components may have numerous advantages to devices and systems as described herein. For example, accommodating a larger battery may permit the monitoring device and/or other components to be powered for longer periods of time, such as at least one day or even several days, such as for an extended golfing trip. As another example, accommodating a larger monitoring device may permit incorporation of additional components and features within the device. Room for additional components outside the monitoring device may also be created. Still other benefits are apparent to those skilled in the art.

Figures 27, 28:
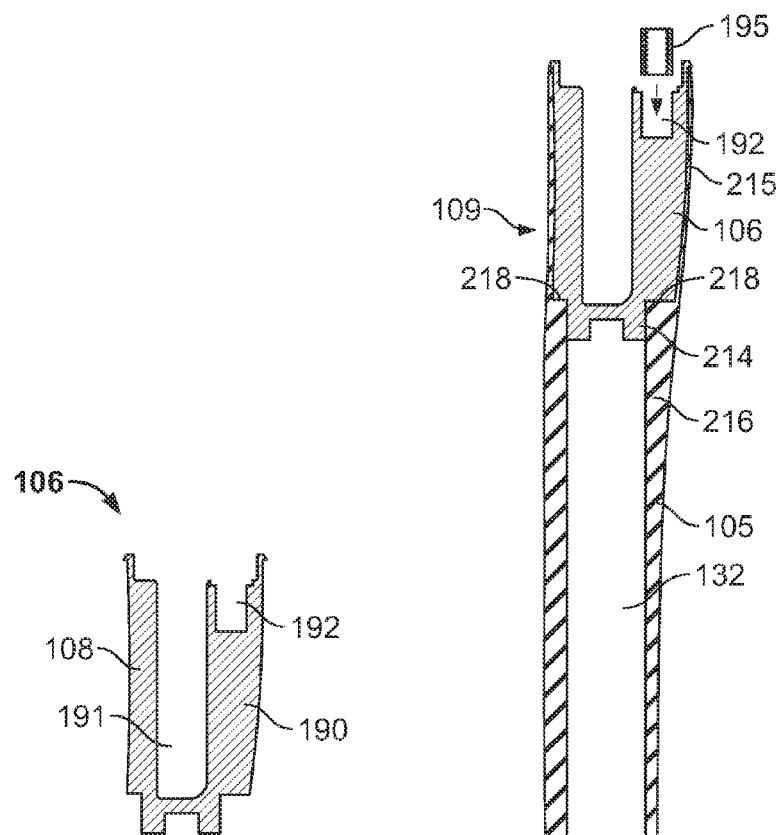

In another embodiment, the shaft 103 may be connected to a receptacle or cartridge holder 106 and a grip member 105 that are co-molded to form a single, integral grip assembly 109, configured to receive the shaft 103, such as in the embodiment in FIGS. 27-32. In this embodiment, the receptacle or cartridge holder 106 defines a housing which is configured to receive components such as the monitoring device 201, which may include the power source 206, and/or other components, One embodiment of a method for assembly of a ball-striking device as described above is illustrated in FIGS. 27-32. First, as seen in FIG. 27, the receptacle 106 is separately molded. In this embodiment, the receptacle 106 is molded to have features similar to the cartridge holder 106 described above in reference to FIG. 6. The receptacle 106 is generally configured to receive the cartridge 200 supporting the monitoring device 201. The receptacle 106 has a main body portion 190 having a first opening 191 therein and a second opening 192. The first opening 191 is generally an elongated slot that extends generally longitudinally into the main body portion 190. The first opening 191 can vary in length and width and is generally dimensioned to receive the portion of the cartridge 200 holding the sensor 201 as described in greater detail below. The first opening 191 is dimensioned such that there is minimum play between the cartridge 200 and the main body portion 190. The second opening 192 includes a connecting structure, such as threading, and may is configured to receive a threaded insert 195 in the embodiment of FIGS. 27-32. The main body portion 190 further defines a recessed portion 193 at a distal end and the first opening 191 and the second opening 192 open at the recessed portion 193. In one embodiment, the receptacle 106 may contain structure for engaging the shaft 103, such as structure to engage the inner surface of the shaft 103 as described above and shown in FIG. 6. In an exemplary embodiment, the receptacle 106 is an integral member and can be formed from a variety of materials known in the art. Further, as seen in FIG. 6, the receptacle 106 may be configured to surround and securely hold the cartridge 200 and thereby further protect the monitoring device 201 from damage due to impact or the elements.

The cartridge 200 is also separately molded to include various structural features as described above, including, for example, the cap member 205, the clip member 207, and the orifice 208. As shown in FIG. 6, the removable cartridge 200 has a cap member 205 having a clip member 207 depending from the cap member 205. The cap member 205 has an orifice 208 extending therethrough and adjacent to the clip member 207. The clip member 207 has a base 209 and a resilient finger 210 extending generally transversely from the base 209 at the end opposite the cap member 205. The base is dimensioned to accommodate the length of the monitoring device 201. The resilient finger 210 engages an end of the monitoring device 201. Thus, it is understood that the monitoring device 201 is inserted into the cartridge 200 wherein the monitoring device 201 is secured generally in an interference fit. One end of the sensor 201 is engaged by the resilient finger 210 and another end of the monitoring device 201 is engaged by an underside of the cap member 205. Accordingly, the monitoring device 201 can be snapped into the clip member 207. If desired, additional fingers or other retaining elements can be incorporated with the clip member 207, and the cartridge 200 and the monitoring device 201 may include complementary engaging structure, such as tabs and slots. For example, additional retaining elements may be employed when a longer base 209 is utilized thus spacing the sensor 201 further away from the cap member 205. It is further understood that the removable cartridge 200 may utilize features of other embodiments described herein. For example, the clip member 207 may have different lengths such as shown in FIG. 11. The receptacle 106 may then have corresponding structure to cooperate with a cartridge 200 with such dimensions. The cartridge 200 may also employ the various lock-out or other identifying structures described herein. In one embodiment, the cartridge 200 is injection molded. The shaft 103 and monitoring device 201 or other sensors are also constructed prior to assembly.

The receptacle 106 is connected to a grip member 105 to form an integral grip assembly 107, as shown in FIGS. 28-32. The grip member 105 forms a grip surface on the end of the shaft 103 that functions as a normal grip. The receptacle 106 and the grip member 105 may be made from the same or different materials, and in one embodiment, the receptacle 106 may be formed from a material that is relatively harder, stronger, and or less flexible than the grip member 105, which may be made from a softer and more flexible material. As examples, the grip member 105 may be made from thermoplastic polyurethane (TPU) or other urethanes, natural or synthetic rubber, silicone materials, epoxies, thermoplastic elastomers (TPE), or other polymeric materials. Additionally, as examples, the receptacle 106 may be made from polypropylene, acetal materials, polycarbonates (PC), acrylonitrile butadiene styrene (ABS), nylon, or other polymeric materials, which may include reinforcement (e.g., glass or graphite). Alternately, the receptacle 106 may be formed from a metallic material or other non-polymer based material. In the embodiment shown in FIGS. 27-32, the grip member 105 completely surrounds the receptacle 106 except for the exposed top of the receptacle 106 (where the recess 193 is located), to provide a continuous outer gripping surface around the receptacle 105. The grip member 105 may have a first portion 215 near the end of the shaft 103 that surrounds the receptacle 106 and a second portion 216 that is located below the receptacle 106, with the first and second portions 215, 216 having different wall thicknesses. In the embodiment of FIGS. 27-32, the first portion 215 has a smaller wall thickness than the second portion 216. Additionally, the receptacle 106 further includes a narrowed portion 214 having a smaller outer dimension that permits it to be received within the second portion 216 of the grip member 105. The receptacle 106 and the grip member 105 both have shoulders 218 that create a rapid dimensional change at the juncture of the first and second portions 215, 216 in the embodiment of FIGS. 27-32, but may have a different structure in other embodiments. It is understood that the grip member 105 and the receptacle 106 may have additional portions with different dimensions in other embodiments.

The grip member 105 defines an elongated central passage 132 that is configured to receive the shaft 103, such that the interior surface of the grip member 105 engages the outer surface of the shaft 103. The narrowed portion 214 of the receptacle 106 contacts the end of the shaft 103 in this embodiment, and may include a structure that engages the shaft 103 in another manner. For example, the receptacle 106 may include a structure that receives a portion of the shaft 103, or a portion that fits within the shaft 103, similar to the embodiment of FIG. 6 described above.

The grip assembly 107 can be manufactured as a single unit and then connected to the shaft 103 during manufacturing, as described below. The receptacle 106 may be connected to the grip member 105 to form the grip assembly through an overmolding process, as described below and illustrated schematically in FIGS. 27-32. As seen in FIG. 28, the receptacle 106 is formed, such as by an injection molding process, including all the features described above. At least some post-manufacturing machining may be necessary in one embodiment. After the receptacle 106 is formed, the grip member 105 is formed by molding a grip material around the receptacle 106 in an overmolding process. It is understood that an overmolding process may include placing the receptacle 106 in a mold cavity and molding the grip material in contact with at least a portion of the outer surface of the receptacle 106. The over-mold grip material also forms the hollow central passage 132 configured to receive a shaft. The receptacle 106 is located at a distal end of the hollow central passage 132. The over-mold grip material forms a single, integral piece with the receptacle 106. In some embodiments, as seen in FIG. 28, the over-mold grip material has a varying thickness, as described above. In other embodiments, the over-mold grip material may only surround a portion of the outer surface of the receptacle 106, and the grip member 105 may leave at least portions of the sides of the receptacle 106 exposed.

Figure 29:
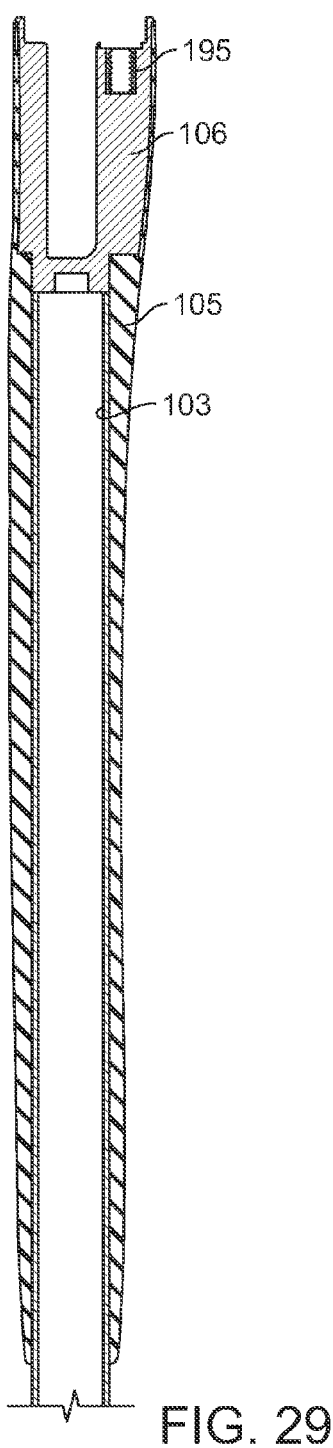
Figure 30:
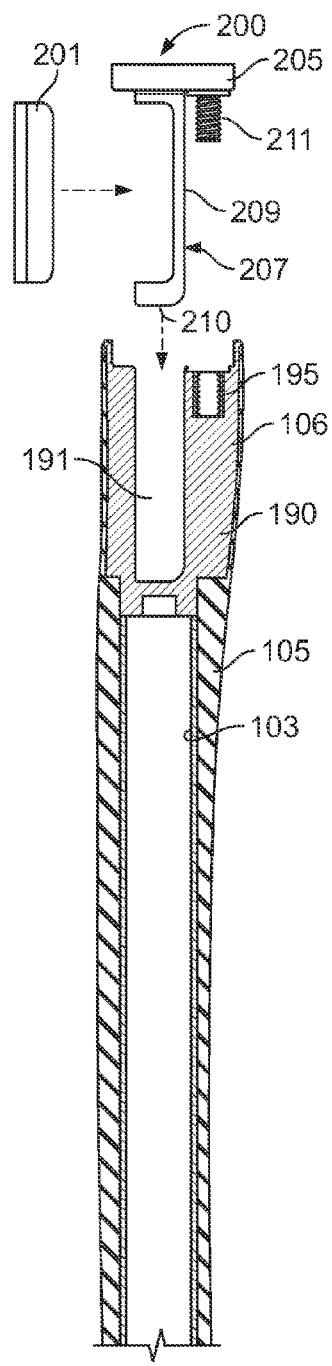

During assembly, as seen in FIG. 28, the threaded insert 195 is inserted into the second opening 192, and in one embodiment, the insert 195 is inserted into the second opening 192 after completion of the grip overmolding. This connection may be secured by an interference fit, a bonding material, or other means. The shaft 103 is inserted into the hollow central passage 132 of the grip member 105, as seen in FIG. 29. The shaft 103 may be secured to the grip member 105 by an interference fit, a bonding material, or other connection technique. The shaft is connected to the receptacle 106 in an exemplary embodiment. The monitoring device 201 or other sensor is inserted into the cartridge 200, as seen in FIG. 30. The removable cartridge 200 is inserted into the receptacle 106. The base 209 and finger 210 holding the monitoring device 201 are inserted into the first opening 191. The structure of the main body portion 190 surrounds and securely holds the cartridge 200 and thereby further protects the monitoring device 201 from damage due to impact or the elements. It is further understood that the first opening 191 is generally non-circular in this embodiment, wherein the clip member 207 holding the monitoring device 201 must be inserted into the first opening 191 in a set, fixed orientation. Further, with minimum play around the sensor 201, the position of the sensor 201 is always known. This aids in the ability to record and analyze data in a desired fashion.

As further shown in FIG. 6 and FIG. 31, the cartridge 200 and the receptacle 106 may be configured to be fastened together by a threaded fastener 211 or other connection member that engages the second opening 192 (e.g., one or more protrusions, flexible tabs, clamps, anchors, etc., which may be mechanically engageable and/or connected using a bonding material). For example, the cap member 205 is received in the recessed portion 193. The cap member 205 is generally flush with the end of the cartridge holder 106. The orifice 208 on the cap member 205 is aligned with the second opening 192. A threaded fastener 211 is inserted through the orifice 208 and secured in the second opening 192. In another embodiment, the second opening 192 may include integral threading or another connecting structure. Thus, removable cartridge 200 is secured in the grip of the club by a single fastener. It is understood that other fastening mechanisms could be utilized between the removable cartridge 200 and the receptacle 106, or otherwise the grip 105. The other fastening mechanisms include snap-fitting configurations or interference fittings as well as other mechanical configurations. With such configuration, the receptacle 106 holding the cartridge 200 is seamlessly integrated into the grip 105 and is virtually undetectable. The golf club appears like any traditional golf club that does not incorporate any sensor technology.

The embodiments of the cartridge 200 and grip assembly 107 as illustrated in FIGS. 27-32 can be used to create a mount for a monitoring device 201 or other component that is concealed within the grip portion and is not externally detectable. These embodiments also provide for removal, reinsertion, and/or interchangeability of the monitoring device 201 as desired. Further, the grip assembly 107 provides a single, integral structure that can be easily connected to the golf club shaft 103 in substantially the same manner as a normal grip, and therefore does not require any specialized assembly. Still further, the use of a co-molding process can decrease the cost and increase the efficiency of manufacturing the grip assembly 107, and can create a single, integral structure. Still other benefits and advantages are apparent to those skilled in the art.

III. CONCLUSION

The present disclosure is described above and in the accompanying drawings with reference to a variety of example structures, features, elements, and combinations of structures, features, and elements. The purpose served by the disclosure, however, is to provide examples of the various features and concepts related to the disclosure, not to limit the scope of the disclosure. One skilled in the relevant art will recognize that numerous variations and modifications may be made to the embodiments described above without departing from the scope of the present disclosure, as defined by the appended claims. For example, the various features and concepts described above in conjunction with FIGS. 1 through 32 may be used individually and/or in any combination or subcombination without departing from this disclosure.

The invention claimed is:

1. A ball striking device comprising:
    a ball striking head;
    a shaft having a fixed end connected to the ball striking head and a distal end opposite the fixed end the shaft extending along an axis between the fixed end and the distal end, the shaft having a first maximum dimension measured perpendicular to the axis; and an extension connected to the distal end of the shaft, the extension having a second maximum dimension measured perpendicular to the axis, wherein the second maximum dimension is greater than the first maximum dimension, and wherein the extension includes a receptacle configured to receive a component.

2. The ball striking device of claim 1, wherein the extension is removably engaged with the shaft.

3. The ball striking device of claim 1, wherein the extension has a first portion having a connector configured to engage the shaft to connect the extension to the shaft and a second portion defining the receptacle, wherein the second portion has the second maximum dimension, and the first portion has a third maximum dimension that is smaller than the second maximum dimension.

4. The ball striking device of claim 3, wherein the first portion of the extension and the second portion of the extension are integrally formed.

5. The ball striking device of claim 3, wherein the connector comprises a protrusion that extends from the second portion and is configured to fit within and extend into the shaft.

6. The ball striking device of claim 3, wherein the extension further comprises a step between the first portion and the second portion, wherein the step extends outwardly from the first portion and creates the difference between the second maximum dimension and the third maximum dimension.

7. The ball striking device of claim 1, further comprising a grip member surrounding a portion of the shaft proximate the distal end and at least partially surrounding the extension.

8. The ball striking device of claim 7, wherein the grip member comprises a first grip member surrounding the portion of the shaft and a second grip member at least partially surrounding the extension, and wherein the first and second grip members are substantially flush with each other.

9. The ball striking device of claim 7, wherein the grip member is formed of a single, integral piece.

10. The ball striking device of claim 1, wherein the extension has an opening providing access to the receptacle, and the ball striking device further comprises a cap configured to cover the opening.

11. The ball striking device of claim 1, wherein the first maximum dimension is 0.5-0.7 inches, and the second maximum dimension is 0.510-1.0 inches.

12. The ball striking device of claim 1, further comprising an electronic module received within the receptacle.

13. The ball striking device of claim 12, wherein the electronic module comprises a sensor configured for sensing a swing parameter of the ball striking device during use.

14. A ball striking device comprising:
a ball striking head;
a shaft having a fixed end connected to the ball striking head and a distal end opposite the fixed end, the shaft extending along an axis between the fixed end and the distal end; and
a grip assembly connected to the distal end of the shaft, the grip assembly comprising a receptacle configured to receive a component and a grip member connected to the receptacle to form the grip assembly as a single, integral piece, the grip member defining a central passage receiving the distal end of the shaft to connect the grip assembly to the shaft.

15. The ball striking device of claim 14, further comprising an electronic module received within the receptacle.

16. The ball striking device of claim 15, wherein the electronic module comprises a sensor configured for sensing a swing parameter of the ball striking device during use.

17. The ball striking device of claim 14, wherein the receptacle includes a first opening and a second opening formed in an end of the receptacle, the first opening extending generally longitudinally and having a first length, and the second opening extending generally longitudinally and having a second length, wherein the first length is greater than the second length, and wherein the first opening is configured to receive the component therein, and the second opening is configured to engage a connection member to retain the component within the first opening.

18. The ball striking device of claim 17, wherein the receptacle includes a recessed portion at the end of the receptacle, wherein the first opening and the second opening are open at the recessed portion.

19. The ball striking device of claim 17, further comprising a cartridge having a cap member and clip member, wherein the cap member covers the first and second openings and the clip member extends from the cap member into the first opening and is configured to engage the component and retain the component within the first opening.

20. The ball striking device of claim 19, wherein the clip member has a base and a finger extending generally transversely from the base, and wherein the cap member, the base, and the finger are configured to engage the component.

21. The ball striking device of claim 19, wherein the cap is received in a recessed portion at the distal end of the receptacle and is flush with the distal end.

22. The ball striking device of claim 21, wherein the cap includes an orifice, wherein the orifice is aligned with the second opening, and wherein a threaded fastener is configured to be inserted through the orifice and secured in a threaded insert within the second opening.

23. The ball striking device of claim 20, further comprising an electronic module wherein the finger engages a first end of the electronic module and the cap engages a second end of the electronic module.

24. A grip assembly configured to connect to a shaft of a ball striking device, the grip assembly comprising:
a grip member having a hollow central passage configured to receive and engage a shaft of a ball striking device to connect the grip assembly to the shaft, the grip member being formed of a first material;
a receptacle located at a distal end of the grip assembly and configured to receive a component, the receptacle being formed of a second material having less flexibility than the first material;
wherein the receptacle and the grip are co-molded to form a single, integral piece.

25. The grip assembly of claim 24, wherein the receptacle includes a first opening and a second opening that extend generally longitudinally inward from the distal end, the first opening having a first length and the second opening having a second length, wherein the first length is greater than the second length, wherein the first opening is configured to receive the component, and the second opening is configured to engage a connection member to retain the component within the first opening.

26. The grip assembly of claim 25, wherein the receptacle includes a recessed portion at the distal end, wherein the first opening and the second opening are open at the recessed portion.

27. The grip assembly of claim 25, further comprising a cartridge having a cap member and a clip member, wherein the cap member covers the first and second openings and the clip member extends from the cap member into the first opening and is configured to engage the component and retain the component within the first opening.

28. The grip assembly of claim 27, wherein the clip member has a base and a finger extending generally transversely from the base, and wherein the cap member, the base, and the finger are configured to engage the component.

29. The grip assembly of claim 27, wherein the cap is received in a recessed portion at the distal end of the grip assembly and is flush with a distal end of the grip assembly.

30. The grip assembly of claim 29, wherein the cap includes an orifice, wherein the orifice is aligned with the second opening, and wherein a threaded fastener is configured to be inserted through the orifice and secured in a threaded insert configured to fit it the second opening.

31. The grip assembly of claim 24, wherein the receptacle includes a first opening extending inward from the distal end and a recessed portion at the distal end, wherein the first opening is open within the recessed portion, the grip assembly further comprising a cartridge having a cap member and a clip member, wherein the cap member covers the first opening and the clip member extends from the cap member into the first opening and is configured to engage the component and retain the component within the first opening.

32. The grip assembly of claim 24, wherein the grip member surrounds the receptacle to form a continuous outer gripping surface, and wherein an end of the receptacle is exposed to enable insertion of the component.

33. A method comprising:
forming a receptacle from a first polymer material, the receptacle having an opening configured to receive one or more components;
molding a grip member by injecting a second polymer material at least partially around the receptacle to form a single, integral co-molded grip assembly, wherein the grip member has a hollow central passage;
wherein the grip assembly is configured to connect to a shaft of a ball striking device by receiving a portion of the shaft within the hollow central passage, wherein the receptacle is located at a distal end of the grip assembly.

34. The method of claim 33, further comprising connecting the shaft to the grip assembly by inserting the portion of the shaft within the hollow central passage.

35. The method of claim 33, wherein the receptacle includes a first opening extending inward from the distal end and a recessed portion at the distal end, wherein the first opening is open within the recessed portion, the grip assembly further comprising a cartridge having a cap member and a clip member, wherein the cap member covers the first opening and the clip member extends from the cap member into the first opening and is configured to engage the component and retain the component within the first opening.

36. The method of claim 33, wherein the grip member surrounds the receptacle to form a continuous outer gripping surface, and wherein an end of the receptacle is exposed at the distal end of the grip assembly to enable insertion of the component.

37. The method of claim 33, wherein the receptacle includes a first opening and a second opening that extend generally longitudinally inward from the distal end, the first opening having a first length and the second opening having a second length, wherein the first length is greater than the second length, wherein the first opening is configured to receive the component, and the second opening is configured to engage a connection member to retain the component within the first opening.

38. The method of claim 37, further comprising inserting a threaded insert into the second opening.

39. The method of claim 37, wherein the receptacle includes a recessed portion at the distal end, wherein the first opening and the second opening are open at the recessed portion.

40. The method of claim 37, further comprising connecting a cartridge to the grip assembly, the cartridge having a cap member and a clip member, wherein the cap member covers the first and second openings and the clip member extends from the cap member into the first opening and is configured to engage the component and retain the component within the first opening.

41. The method of claim 33, wherein the receptacle is formed by injection molding the first polymer material.

* * * * *